United States Patent [19]
Kurokawa et al.

[11] Patent Number: 5,485,623
[45] Date of Patent: Jan. 16, 1996

[54] INFORMATION PROCESSOR HAVING HIGH SPEED AND SAFETY RESUME SYSTEM

[75] Inventors: Yoshiki Kurokawa, Chigasaki; Kiyokazu Nishioka, Odawara; Hideki Kamimaki, Yokohama; Yoshifumi Atarashi, Owariasahi, all of Japan

[73] Assignee: Hitachi, Ltd., Tokyo, Japan

[21] Appl. No.: 205,708

[22] Filed: Mar. 3, 1994

[30] Foreign Application Priority Data

Mar. 10, 1993  [JP]  Japan  .................................. 5-049419
Apr. 5, 1993   [JP]  Japan  .................................. 5-078161

[51] Int. Cl.$^6$ ................................................ G06F 1/26
[52] U.S. Cl. ........................ 395/182.2; 364/707; 395/750
[58] Field of Search ................................. 395/375, 550, 395/575, 800, 750; 364/707, 483; 371/66

[56] References Cited

U.S. PATENT DOCUMENTS

| | | | |
|---|---|---|---|
| 4,381,552 | 4/1983 | Nocilini et al. | 364/707 |
| 4,698,748 | 10/1987 | Juzswik et al. | 395/750 |
| 4,747,041 | 5/1988 | Engel et al. | 395/750 |
| 4,851,987 | 7/1989 | Day | 395/550 |
| 4,980,836 | 12/1990 | Carter et al. | 364/483 |
| 5,167,024 | 11/1992 | Smith et al. | 395/375 |
| 5,175,845 | 12/1992 | Little | 395/550 |
| 5,182,810 | 1/1993 | Bartling et al. | 395/750 |
| 5,203,003 | 4/1993 | Donner | 395/800 |
| 5,218,704 | 6/1993 | Watts, Jr. et al. | 395/750 |
| 5,283,905 | 2/1994 | Saadeh et al. | 395/750 |
| 5,339,437 | 8/1994 | Yuen | 395/700 |

FOREIGN PATENT DOCUMENTS

| | | |
|---|---|---|
| 56-108119 | 8/1981 | Japan . |
| 57-94821 | 6/1982 | Japan . |
| 2-201671 | 8/1990 | Japan . |
| 2-294760 | 12/1990 | Japan . |
| 3-027419 | 2/1991 | Japan . |
| 4-014118 | 1/1992 | Japan . |
| 4-188209 | 7/1992 | Japan . |
| 4-281507 | 10/1992 | Japan . |
| 58-205226 | 11/1993 | Japan . |

OTHER PUBLICATIONS

Uesaka, Yasushi, et al., "Resume Function on Distributed Computing Technology," Multimedia Communication and Distributed Processing, vol. 59, No. 9, Jan. 29, 1993, pp. 65–72, (English Abstract–p. 65).

Primary Examiner—Parshotam S. Lall
Assistant Examiner—Viet Vu
Attorney, Agent, or Firm—Fay, Sharpe, Beall, Fagan, Minnich & McKee

[57] ABSTRACT

An information processor operating with a battery writes data which exists in a register of a CPU at that time into a predetermined stack area for transfer of an RAM when a suspend command is received in the normal operation state of the processor and shifts to the suspended state that the power supply to the minimum circuit components including the RAM is maintained and the power supply to the other circuit components is stopped. When insufficient power of the battery is detected in the suspended state, the information processor is started temporarily so as to automatically transfer and store the data in the RAM into a storage device using a non-volatile memory device.

11 Claims, 20 Drawing Sheets

| NAME OF SIGNAL | R | S | Q | $\bar{Q}$ |
|---|---|---|---|---|
| STATE | H | H | Q | $\bar{Q}$ |
|  | H | L | H | L |
|  | L | H | L | H |
|  | L | L | UNDEFINED | |

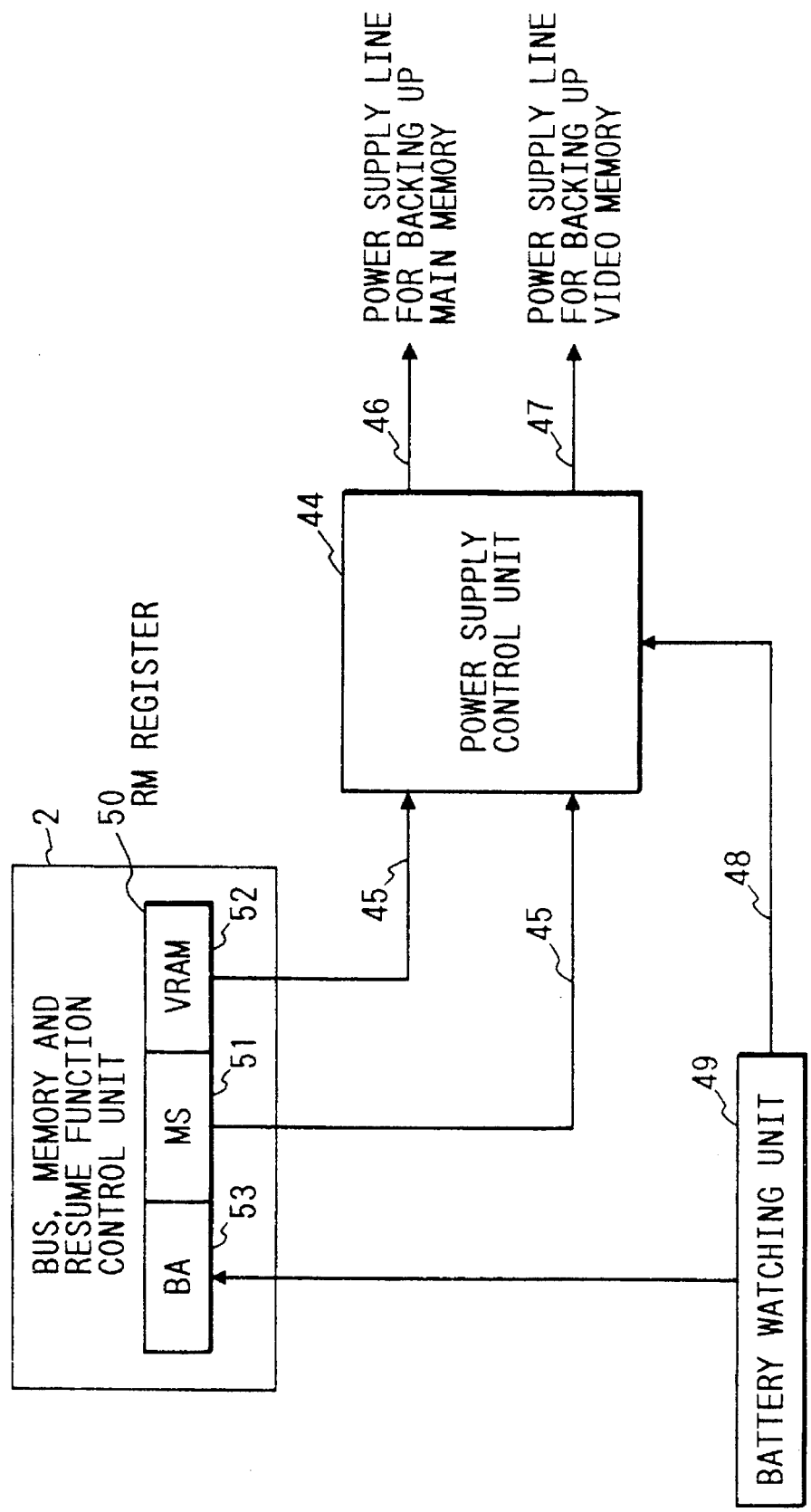

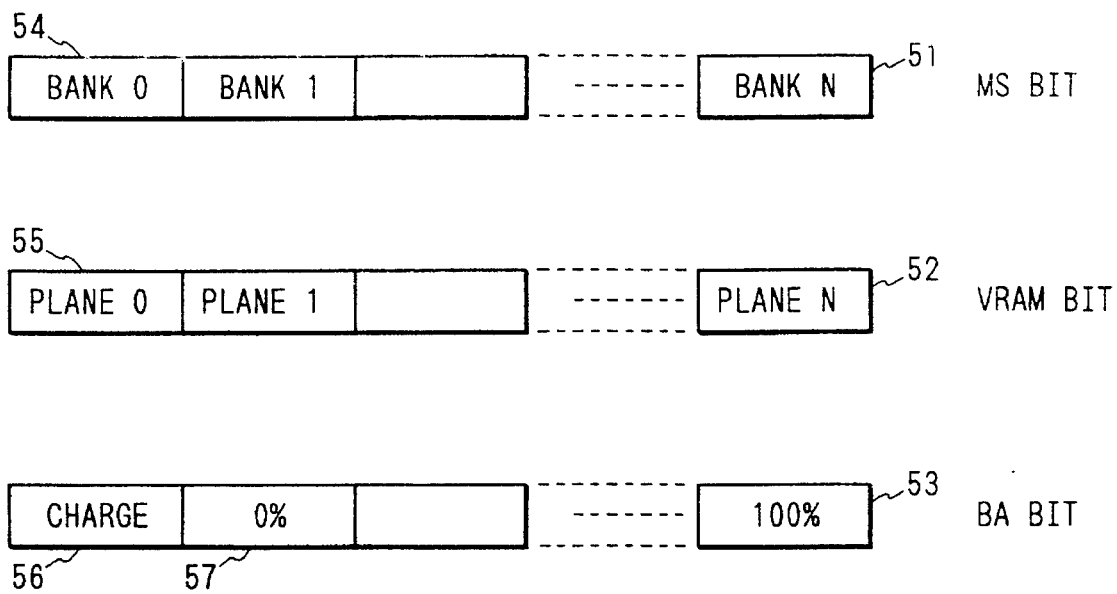
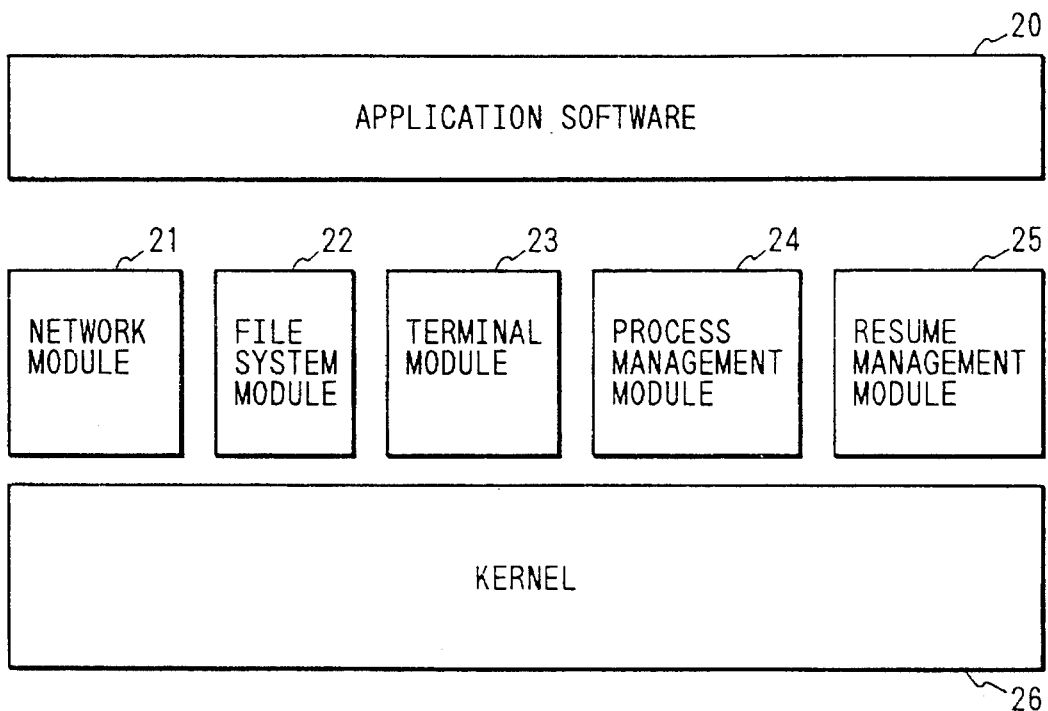

INFORMATION PROCESSOR HAVING HIGH SPEED AND SAFETY RESUME SYSTEM

BACKGROUND OF THE INVENTION

The present invention relates to an information processor operating with a battery such as a portable personal computer, word processor, terminal device for work station, and computer with hand writing pen input device and more particularly to an information processor having a resume function which is a characteristic of an information processor operating with a battery and is improved.

Conventionally, suspending processing for stopping a CPU (central processing unit) when a computer is not to be used temporarily and resuming the CPU to the state before stopping the CPU when reusing the CPU from the suspended state are performed as resume function management. If a computer which has not the aforementioned suspend function and resume function is left as it is when it is not to be used temporarily, the power consumption during operation is required as it is and an increase in power consumption results. When all softwares end, and power is turned off, and all the softwares are restarted so as to reuse them, the power consumption is increased due to these processings. By adding and using the suspend function and resume function, the power consumption can be reduced.

The following methods are conventionally known as such a suspend method and resume method.

(i) A method for stopping only the CPU clock (Japanese Patent Application Laid-Open No. 58-205226)

(ii) A method for reading the CPU state into the outside of the CPU, transferring it to a memory, and turning the CPU off (Japanese Patent Application Laid-Open No. 3-27419)

(iii) A method for recording contents of the CPU and memory in a non-volatile memory device such as a hard disk and turning the CPU and memory off (Japanese Patent Application Laid-Open No. 56-108119, Japanese Patent Application Laid-Open No. 57-94821)

The following two points are most important factors in the above three methods. Namely, they are the power consumption required in the suspended state when the CPU is stopped (hereinafter called power consumption in the suspended state) and the time and power consumption required for the transfer transaction from the normal operation state to the suspended state when the CPU is stopped (hereinafter called suspend transaction time and suspend transaction power consumption). When the aforementioned three methods are discriminated from the above two viewpoints and lined up in the ascending order of magnitude of power consumption in the suspended state, the order is (iii), (ii), and (i). When the methods are lined up in the ascending order of magnitude of suspend transaction time and suspend transaction power consumption, the order is (i), (ii), and (iii).

Such suspension of processing is often used in a miniature information processor operating with a battery recently as an effective means for reducing power consumption.

The method (iii) mentioned above is excellent in the power consumption reduction effect and the power consumption in the suspended state may be reduced to 0. Therefore, data erasure and file system destruction due to insufficient power of a battery will not be caused. However, the method (iii) requires the suspend transaction time and suspend transaction power consumption in proportion to the memory amount to be transferred, so that as the memory capacity of an information processor is increased, the suspend transaction time is increased and the suspend transaction power consumption is also increased. Therefore, firstly when the suspend transaction time is increased, the suspend function is hard to use and secondly when the suspend function and resume function are performed for a short time, not only the power consumption reduction effect is lost but also the power consumption is increased.

Therefore, a method for shortening the suspend transaction time using the methods (i) and (ii) mentioned above and reducing the suspend transaction power consumption may be considered. However, the methods (i) and (ii) cannot reduce the power consumption in the suspended state to 0. Therefore, there is a possibility that the power of the battery is exhausted during suspension of drive of the battery in the worst case. If this occurs, the data is erased and furthermore the file system may be destroyed.

As mentioned above, according to the conventional methods, even when the method (iii) is used, the suspend transaction time is increased as the capacity of a memory is increased and when the CPU is suspended for a short time, the power consumption is also increased. On the other hand, the methods (i) and (ii) cannot take action when the power of the battery becomes insufficient during suspended state.

SUMMARY OF THE INVENTION

An object of the present invention is to provide an information processor operating with a battery which has a function for reducing the suspend transaction time and suspend transaction power consumption and for saving data surely even when the power of a battery becomes insufficient during suspended state.

The above object is accomplished according to the present invention providing an information processor operating on power supplied from a battery which comprises a central processing unit, a memory management means, a random access memory, a read only memory, a data storage means for holding stored data even if no power is supplied, an input means for inputting commands, a battery for supplying power, a battery management means for receiving power from the above battery, for supplying the power selectively to the above central processing unit, the above memory management means, the above random access memory, the above read only memory, the above data storage means, and the above input means, and for sending a battery Low signal when the power of the above battery becomes insufficient, a suspend management unit for sending a suspend transaction interrupt signal and a suspend status signal indicating that the information processor is in the suspended state at present when a suspend command is inputted from the above input means and for sending a battery management signal for resume when a resume command is inputted from the above input means, a transfer decision unit for sending a transfer transaction trigger signal on the basis of the battery Low signal sent from the above battery management means and the suspend status signal sent from the above suspend management unit, and a transfer management unit for sending a battery management signal for transfer to the above battery management means and furthermore a transfer transaction interrupt signal to the above central processing unit when the transfer transaction trigger signal sent from the above transfer decision unit is received, wherein when the suspend command for suspending the processing of the above information processor is given to the above suspend management unit from the above input means, the above suspend management unit sends the suspend transaction interrupt signal to the above central processing unit, and the above central processing unit received the suspend transaction interrupt signal stops the job which is in execution at that time and stores the data which exists in the central processing unit itself at that time in the above random access memory, and thereafter the above central processing unit sends a battery management signal for suspend transaction to the above battery management means, and the above battery management means received the battery management signal for suspend transaction stops supply of power to the above central processing unit, the above memory management means, the above read only memory, and the above data storage means, and therefore the above information processor shifts to the suspended state, and wherein if the above battery power becomes insufficient when the above information processor is in the above suspended state, the above battery management means sends a battery Low signal to the above transfer decision unit, and the above transfer decision unit sends a transfer transaction trigger signal to the above transfer management unit on the basis of the battery Low signal and the suspend status signal which is sent from the above suspend transaction unit already, and the above transfer management unit sends a battery management signal for transfer to the above battery management means and furthermore a transfer transaction interrupt signal to the above central processing unit according to the transfer transaction trigger signal, and the above battery management means received the battery management signal for transfer supplies power to the above central processing unit, the above memory management means, the above read only memory, and the above data storage means again, and the above central processing unit which is started accordingly stores the data stored in the above random access memory in the above data storage means which can save stored data even if no power is supplied in response to the above transfer transaction interrupt signal sent from the above transfer management unit.

BRIEF DESCRIPTION OF THE DRAWINGS

FIG. 20 is a block diagram showing the power supply control related part which is extracted from FIG. 19.

FIG. 21 is a drawing showing another configuration example of the RM register shown in FIG. 20.

FIG. 22 is a drawing showing a configuration example of the operating system of the information processor of the present invention.

DETAILED DESCRIPTION OF THE PREFERRED EMBODIMENTS

The embodiments of the present invention will be explained hereunder.

Figure 1:
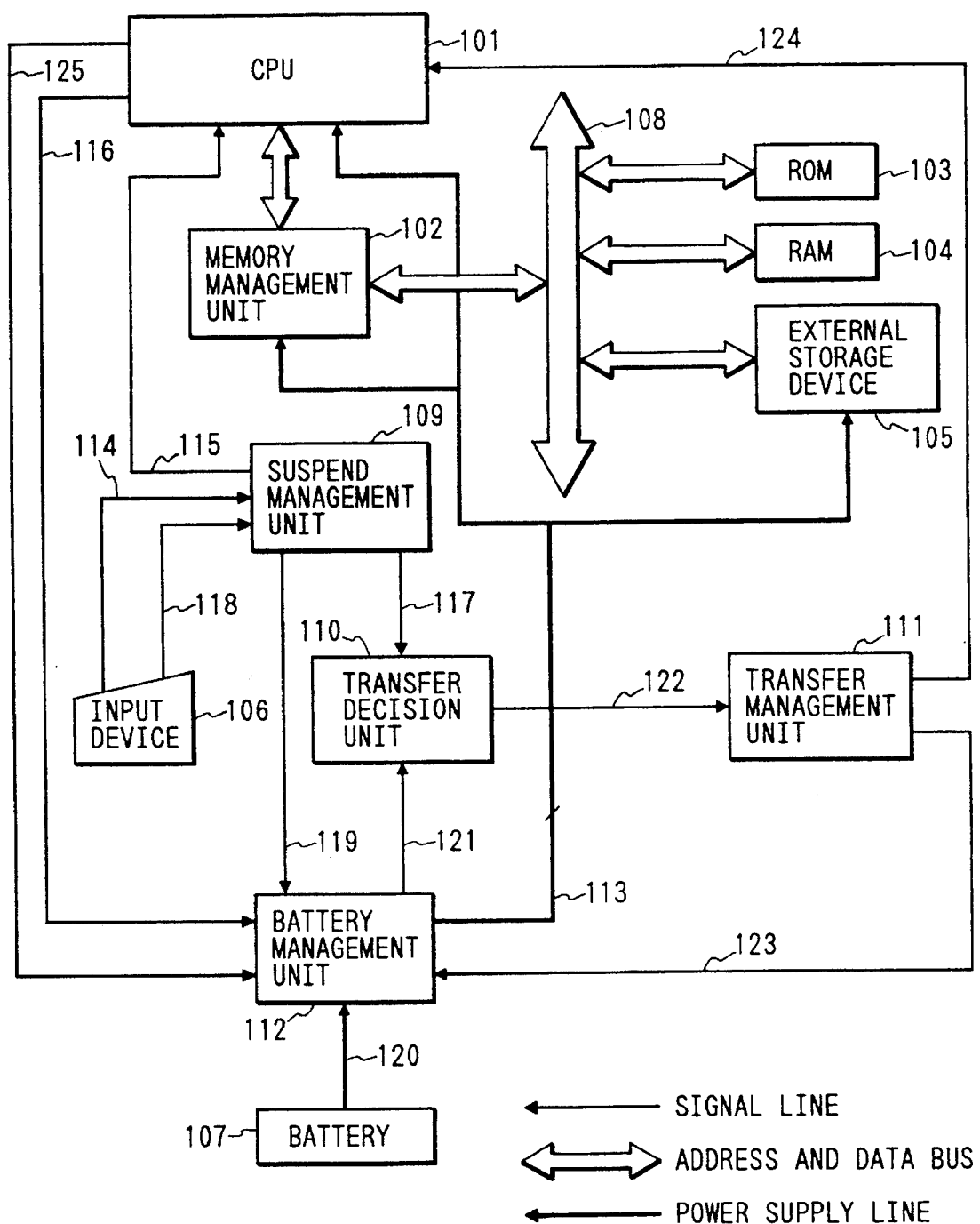
FIG. 1 is a block diagram showing an information processor operating with a battery relating to the first embodiment of the present invention.
Figure 2:
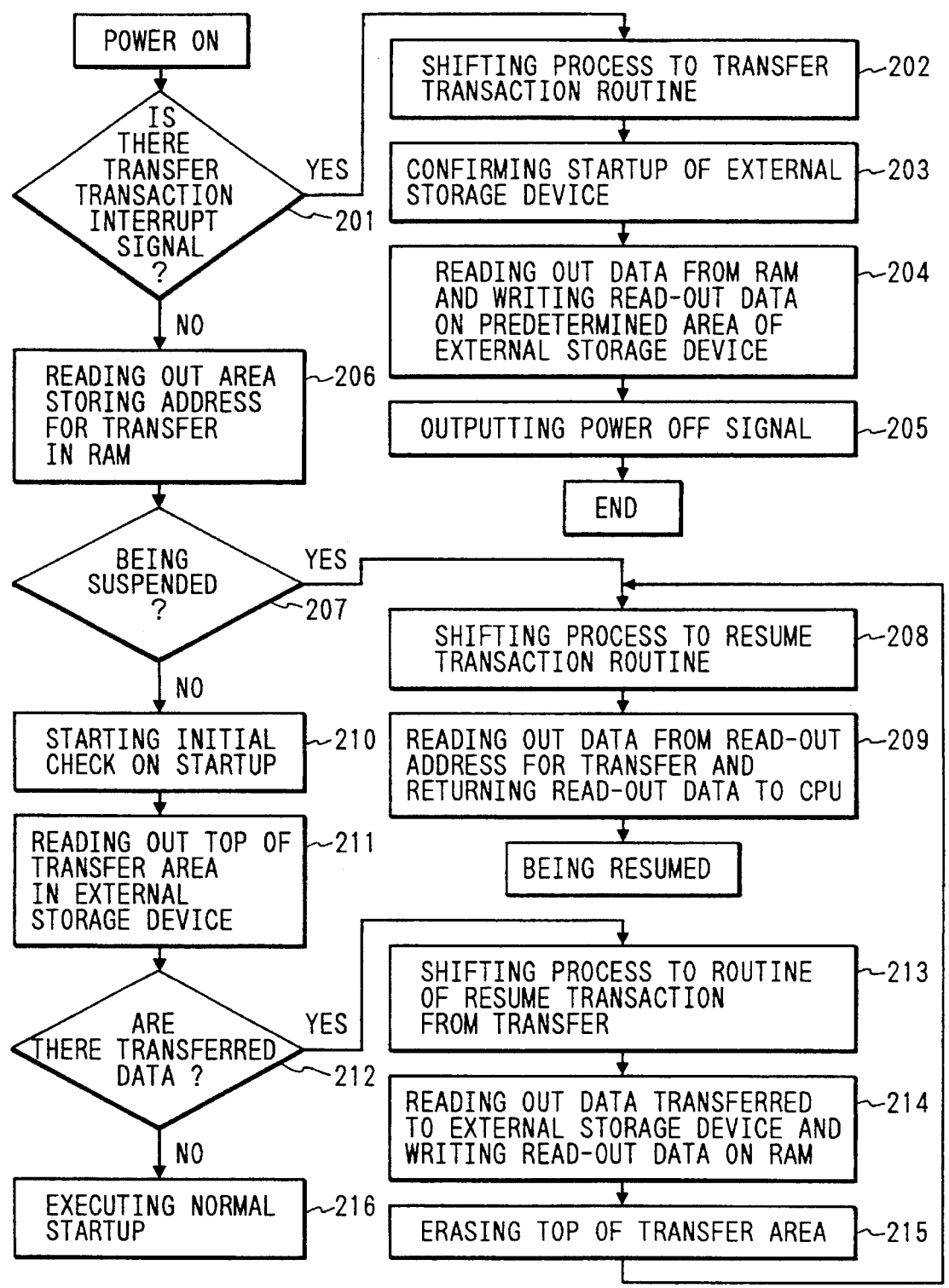
FIG. 2 is a flow chart showing the startup transaction of the CPU in the first embodiment of the present invention.

FIG. 1 is a block diagram showing the constitution of an information processor operating with a battery relating to the first embodiment of the present invention and FIG. 2 is a flow chart showing the startup transaction of the CPU in this embodiment.

In FIG. 1, a reference numeral 101 indicates a CPU (central processing unit), 102 a memory management unit, 103 a ROM, 104 a RAM, 105 an external storage device using a non-volatile memory device, for example, such as a hard disk storage device, an optical disk storage device, a magneto-optical disk storage device, and an IC card memory device, 108 an address/data bus, 106 an input device such as a keyboard, 107 a battery (primary battery or secondary battery), 112 a battery management unit, 113 and 120 power supply lines, 109 a suspend management unit, 110 a transfer decision unit, and 111 a transfer management unit. Also in FIG. 1, a reference numeral 114 indicates a suspend transaction start signal, 115 a suspend transaction interrupt signal, 116 a battery management signal for suspend transaction, 117 a suspend status signal, 118 a resume transaction start signal, 119 a battery management signal for resume, 121 a battery Low signal, 122 a transfer transaction trigger signal, 123 a battery management signal for transfer, 124 a transfer transaction interrupt signal, and 125 a power off signal.

The operation of the information processor of this embodiment having the aforementioned constitution will be explained hereunder.

In the normal operation state of the information processor, power from the battery 107 is supplied to at least the CPU 105, the memory management unit 102, the ROM (read only memory) 103, the RAM (random access memory) 104, the external storage device 105, the address/data bus 108, the battery management unit 112, the input device 106, and the suspend management unit 109 via the battery management unit 112 (power is supplied to all the circuit components of the information processor which are necessary for the normal operation). When a suspend command is inputted to the input device 106 by an operator at this time, the suspend transaction start signal 114 is sent from the input device 106 to the suspend management unit 109 and the suspend transaction interrupt signal 115 is sent from the suspend management unit 109 received the signal 114 to the CPU 101. By doing this, the CPU 101 received the suspend transaction interrupt signal 115 stops the job which is being processed at present, transfers the current register status, that is, the data which exists in the register when the job is suspended into the stack area of the RAM 104, that is, stores the data in the RAM 104, and shifts the process to the suspend transaction routine in the ROM 103. The CPU 101 writes the address of the above stack area for transfer at a predetermined location of the RAM 104 by this routine and sends the battery management signal for suspend transaction 116 for turning off the CPU 101, the memory management unit 102, the ROM 103, and the external storage device 105 to the battery management unit 112 finally. Thereafter, the battery management unit 112 received the above battery management signal for suspend transaction 116 turns off the CPU 101, the memory management unit 102, the ROM 103, and the external storage device 105 and the processor (information processor) shifts to the suspended state. In this suspended state, power is supplied to at least the part of the input device 106 which inputs a resume command, the suspend management unit 109, the battery management unit 112, and the RAM 104 (power is supplied to the minimum circuit components including the RAM 104).

When a resume command is inputted into the input device 106 by an operator in the above suspended state of the information processor, the resume transaction start signal 118 is sent from the input device 106 to the suspend management unit 109 and the battery management signal for resume 119 is sent from the suspend management unit 109 received the signal 118 to the battery management unit 112. By doing this, the battery management unit 112 received the battery management signal for resume 119 turns on the CPU 101, the memory management unit 102, the ROM 103, and the external storage device 105. When the power is turned on, the CPU 101 executes the startup transaction routine in the ROM 103 shown in FIG. 2. Namely, the CPU 101 reads out the location where the address of the stack area for transfer is written when the above processing for suspending is performed by this startup transaction routine (Step 206 shown in FIG. 2). When the address is written, the CPU 101 decides that it is resume transaction (Step 207) and shifts the process to the resume transaction routine in the ROM 103 (Step 208). The resume transaction routine returns the above register status of the CPU 101 which is suspended and transferred to the original state, that is, reads out the data stored in the RAM 104 and stores it in the register in the former state (Step 209) and restarts the process.

When the power of the battery 107 becomes insufficient, it is detected by the voltage detection means in the battery management unit 112 and the battery Low signal 121 indicating that the remaining power of the battery is low is sent from the battery management unit 112. The battery Low signal 121 and the suspend status signal 117 which is sent from the suspend management unit 109 in the above suspended state are supplied to the transfer decision unit 110. When both signals 117 and 121 are true, the transfer transaction trigger signal 122 is sent from the transfer decision unit 110 to the transfer management unit 111. The transfer management unit 111 received the transfer transaction trigger signal 122 sends the battery management signal for transfer 123 to the battery management unit 112 and the battery management unit 112 received the signal 123 turns on the CPU 101, the memory management unit 102, the ROM 103, and the external storage device 105. When the power is turned on, the CPU 101 executes the startup transaction routine in the ROM 103 shown in FIG. 2. Namely, the CPU 101 checks the transfer transaction interrupt signal 124 sent from the transfer management unit 111 first and decides whether it is startup or transfer transaction (Step 201 shown in FIG. 2). When the transfer transaction interrupt signal 124 is true, the CPU 101 shifts the process to the transfer transaction routine in the ROM 103 (Step 202) and the transfer transaction routine confirms that the external storage device 105 starts up (Step 203), reads out the contents of the ROM 104 sequentially, and writes the data which is read from the RAM 104 in the predetermined stack area for transfer of the external storage device 105 (Step 204). When the writing into the external storage device 105 ends completely, the CPU 101 sends the power off signal 125 to the battery management unit 112 (Step 205). By doing this, the battery management unit 112 turns all the units off and the transfer transaction routine for the external storage device 105 ends.

The above resume transaction from the transferred state is executed as shown below. When the power is turned on again after the battery 107 is replaced (in the case of a secondary battery, after the battery 107 is charged), the CPU 101 executes the startup transaction routine in the ROM 103 shown in FIG. 2. In the startup transaction routine, the CPU 101 reads out a part of the area in the external storage device 105 (top of the transfer area) where the above data in the RAM is transferred and stored (Step 211 shown in FIG. 2) and decides whether the transfer transaction is executed or not (Step 212). When the transfer transaction is executed, the CPU 101 reads out the data which is transferred and stored in the external storage device 105 sequentially, writes it in the predetermined stack area for transfer of the RAM 104 (Step 214), writes all the data which is transferred and stored in the external storage device 105 into the RAM 104, erases the area (top of the transfer area) which is used to decide whether the transfer transaction of the external storage device 105 is executed or not (Step 215), shifts the process to the resume transaction routine (Step 208 mentioned above), and completes the resume transaction.

Figures 3, 4:
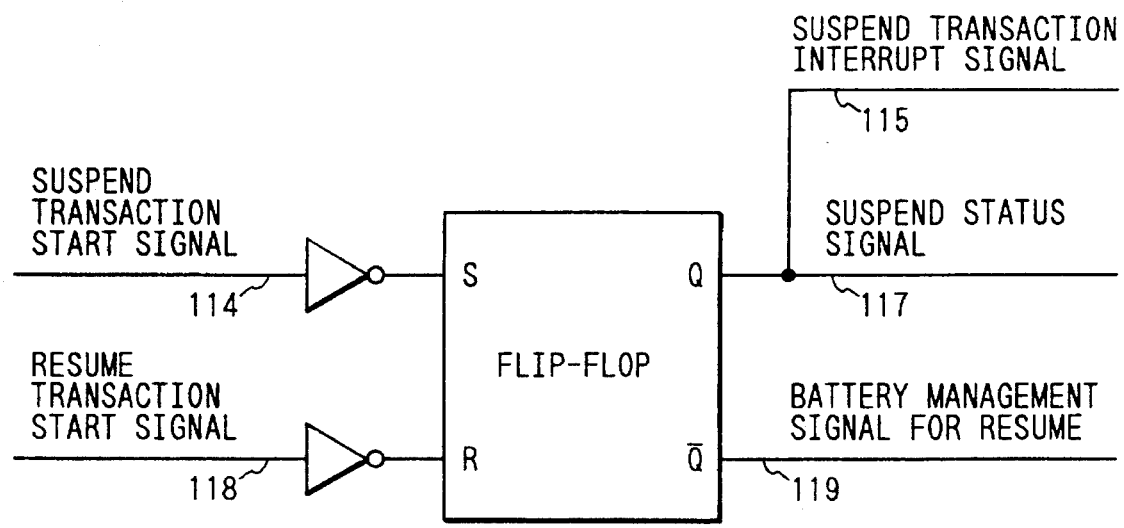
FIG. 3 is a logical circuit diagram showing an actual example of the suspend management unit shown in FIG. 1.
FIG. 4 is an illustration showing a truth table of the flip-flop shown in FIG. 3.

FIG. 3 is a logical circuit diagram showing an actual example of the suspend management unit 109 shown in FIG. 1. Assuming that five signals (the signals 114, 115, 117, 118, and 119 mentioned above) relating to the suspend management unit 109 are actively high, the suspend management unit 109 is realized by two NOT gates and a flip-flop. The truth table of the flip-flop is as shown in FIG. 4 and any logic which conforms to this truth table is acceptable. When the suspend transaction start signal 114 is H (high) in the circuit shown in FIG. 3, the Q output of the flip-flop is H (high) and the Q- (reverse Q) output is L (low). Therefore, the suspend transaction interrupt signal 115 and the suspend status signal 117 are true and the battery management signal for resume 119 is false. Even if the suspend transaction start signal 114 becomes L thereafter, since the flip-flop holds the status, the statuses of the above three signals are held. When the resume transaction start signal 118 becomes H, the Q output of the flip-flop is L and the Q (reverse Q) output is H. As a result, the suspend transaction interrupt signal 115 and the suspend status signal 117 are false and the battery management signal for resume 119 is true. Even if the resume transaction start signal 118 becomes L thereafter, the statuses of the above three signals are held by the flip-flop.

Figure 5:
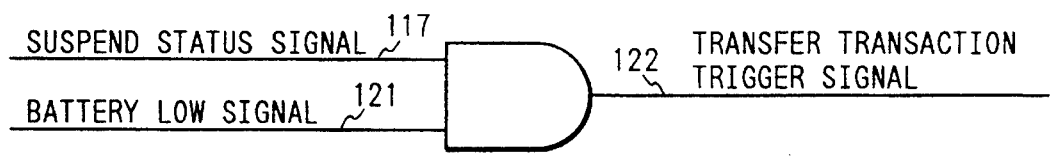
FIG. 5 is a logical circuit diagram showing an actual example of the transfer decision unit shown in FIG. 1.

FIG. 5 is a drawing showing an actual example of the transfer decision unit 110 shown in FIG. 1. Assuming that three signals (the signals 117, 121, and 122 mentioned above) relating to the transfer decision unit 110 are actively high, the transfer decision unit 110 is realized by an AND gate. As shown in FIG. 5, when both the suspend status signal 117 and the battery Low signal 121 become H, the transfer transaction trigger signal 122 is H.

Figure 6:
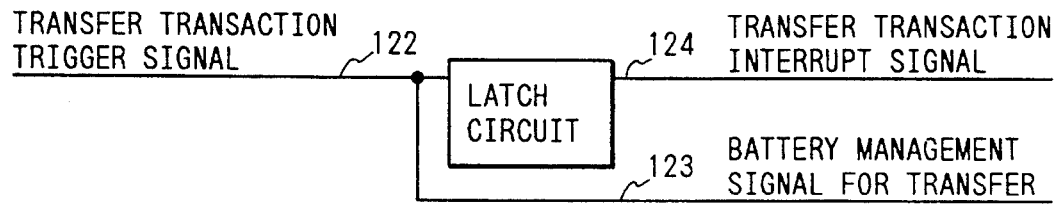
FIG. 6 is a logical circuit diagram showing an actual example of the transfer management unit shown in FIG. 1.

FIG. 6 is a drawing showing an actual example of the transfer management unit 111 shown in FIG. 1. Assuming that three signals (the signals 122, 123, and 124 mentioned above) relating to the transfer management unit 111 are actively high, the transfer management unit 111 is realized by a latch circuit which holds the inputted trigger signal thereafter. As shown in FIG. 6, the transfer transaction trigger signal 122 is latched and changed to the transfer transaction interrupt signal 124. In this example, the signal line for the transfer transaction trigger signal 122 is directly connected to the signal line of the battery management signal for transfer 123.

Figure 7:
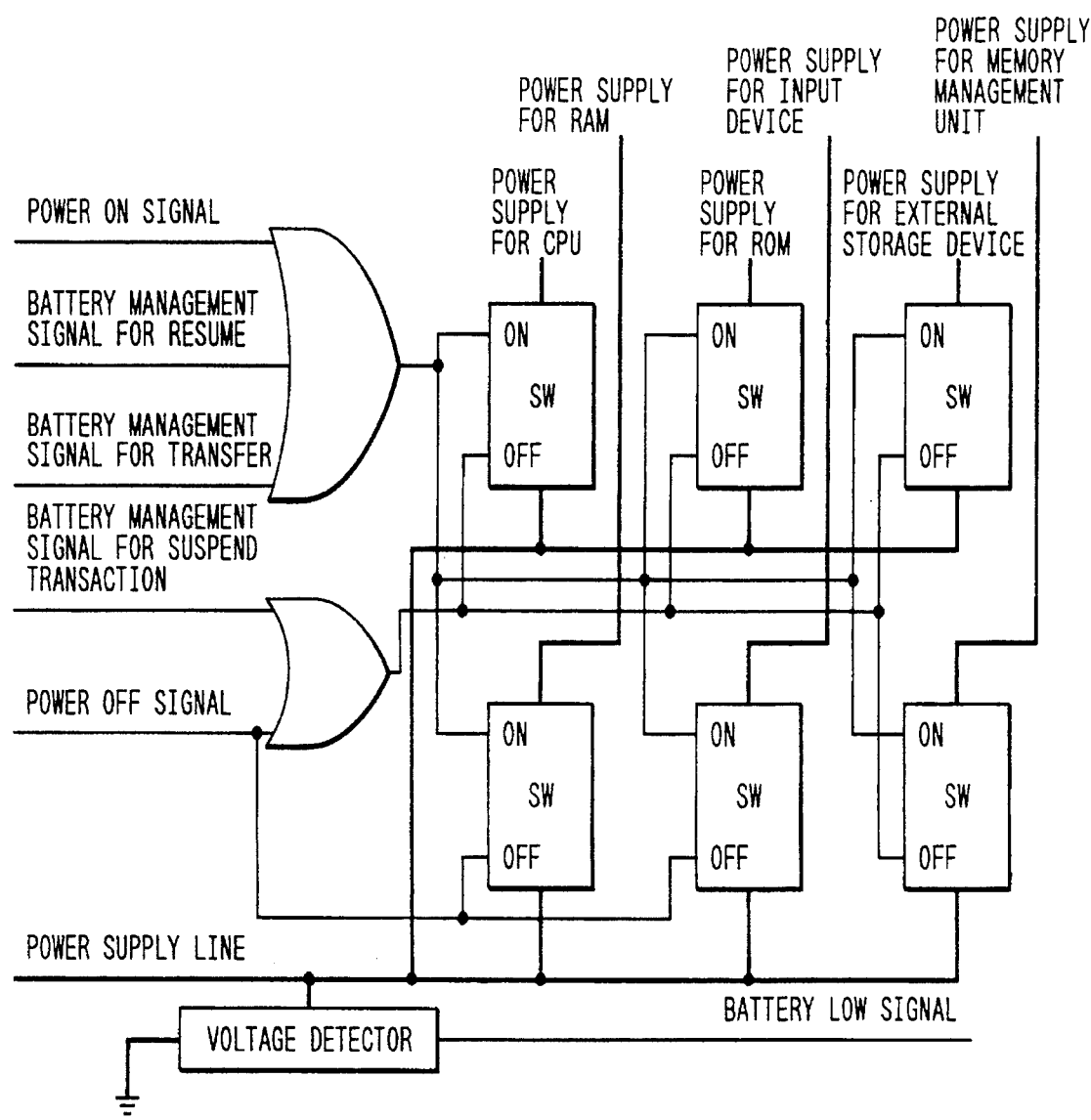
FIG. 7 is a block diagram showing an actual example of the battery management unit shown in FIG. 1.
Figure 8:
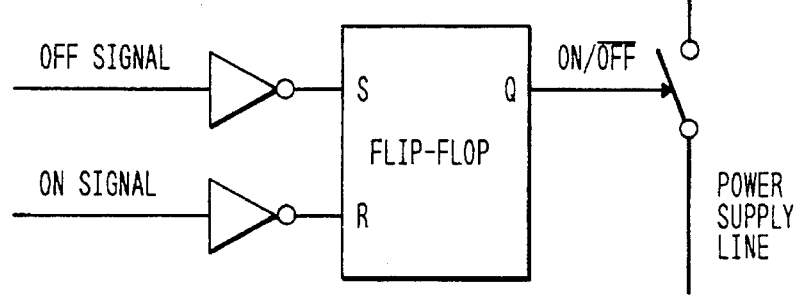
FIG. 8 is a logical circuit diagram showing the constitution of the power ON/OFF switch shown in FIG. 7.

FIG. 7 is a block diagram showing an actual example of the battery management unit 112 shown in FIG. 1. The battery management unit 112 in this example consists of two OR gates, 6 power ON/OFF switches which will be described later, and a voltage detector for watching the supply voltage and deciding the value of an output signal to be true when the input voltage lowers less than the predetermined threshold voltage. The power ON/OFF switch used in FIG. 7 consists of a logical circuit as shown in FIG. 8.

In the battery management unit 112, when a power ON signal, or the battery management signal for resume 119, or the battery management signal for transfer 123 is true, power is supplied to all the circuit components (the aforementioned external storage device 105 is included) of the information processor from the battery 107. When the battery management signal for suspend transaction 116 is true, the CPU 101, the memory management unit 102, the ROM 103, and the external storage device 105 are turned off and power is supplied to the RAM 104 and the input device 106 from the battery 107. When the power off signal 125 is true, all the circuit components (the aforementioned external storage device 105 is included) of the information processor are turned off.

According to this embodiment, as mentioned above in detail, when the suspend command is received, the CPU 101 writes the current register status of the CPU into the predetermined stack area for transfer of the RAM 104 and shifts to the suspended state that the power supply to the minimum circuit components including the RAM 104 is kept and the power supply to the other circuit components is stopped. Therefore, the aforementioned suspend transaction time can be shortened and the aforementioned suspend transaction power consumption is reduced, so that the power consumption of the information processor can be reduced greatly. When insufficient power of the battery 107 is detected in the suspended state, the data of the RAM 104 is automatically transferred and stored in the external storage device (storage device using a non-volatile memory device), so that a trouble due to insufficient power of the battery in the suspended state can be prevented and the information processor can be protected from data destruction.

Figure 9:
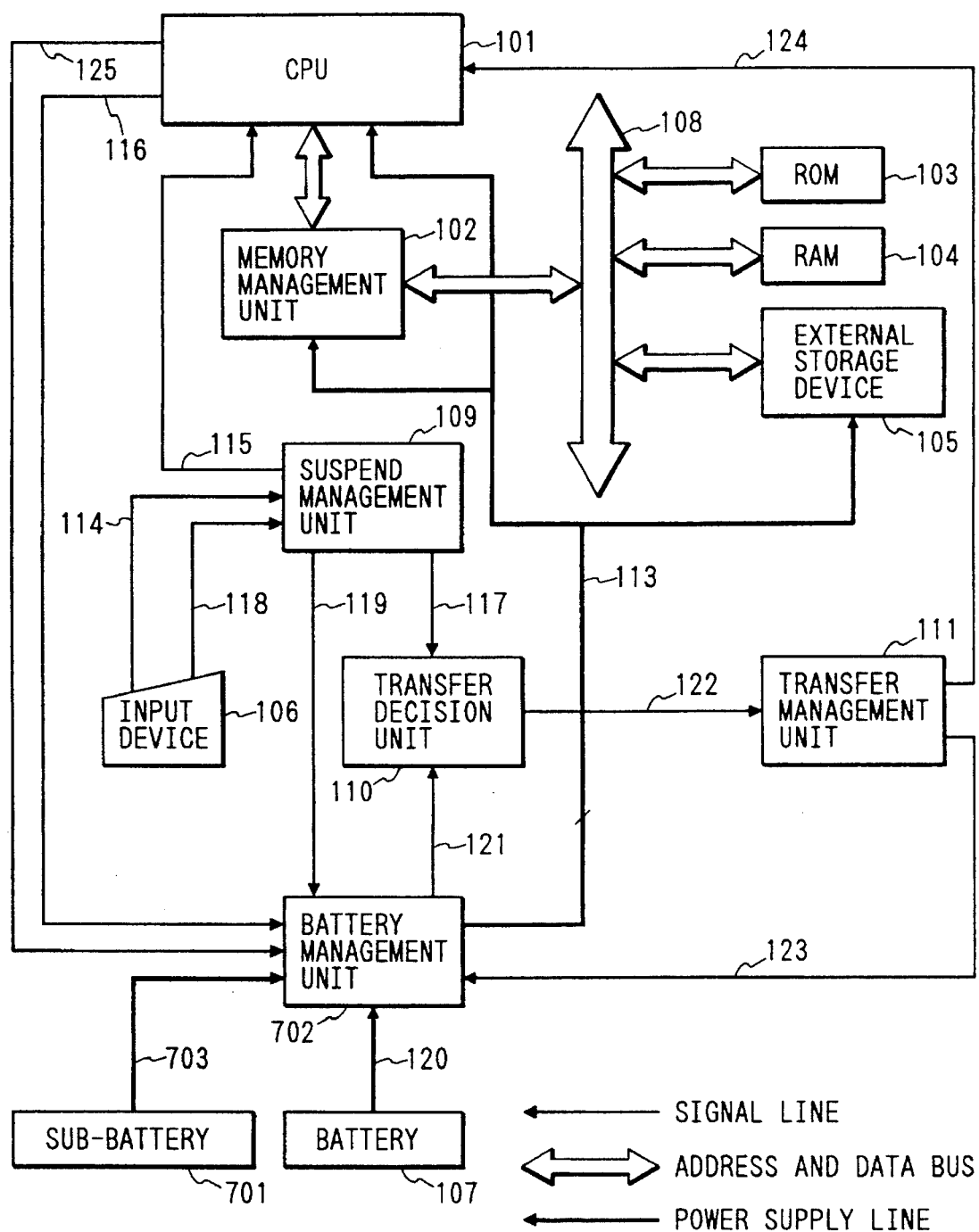
FIG. 9 is a block diagram showing an information processor operating with a battery relating to the second embodiment of the present invention.

Next, the second embodiment of the present invention will be explained with reference to FIGS. 9 to 11. FIG. 9 is a block diagram showing an information processor operating with a battery in this embodiment. A difference between this embodiment and the aforementioned first embodiment is that a sub-battery 701 is added and the above battery 107 is used as a main battery. In FIG. 9, a reference numeral 701 indicates a sub-battery having a capacity smaller than that of the battery (main battery) 107 and 703 a power supply line for the sub-battery. A reference numeral 702 indicates a battery management unit, which uses the main battery 107 and the sub-battery 701 separately, supplies power selectively to each unit, detects a voltage drop of the main battery 107 in the same way as with the first embodiment, and outputs the aforementioned battery Low signal 121.

According to the first embodiment, as mentioned above, when the battery Low signal 121 is outputted in the suspended state of the information processor, the transaction that the data stored in the RAM 103 is transferred an stored in the external storage device 105 is executed by the remaining power of the battery 107. According to this embodiment, however, when the battery Low signal 121 is outputted due to consumption of the battery (main battery) 107 in the suspended state of the information processor, data is transferred and stored in the external storage device 105 by power supply from the sub-battery 701.

Figure 10:
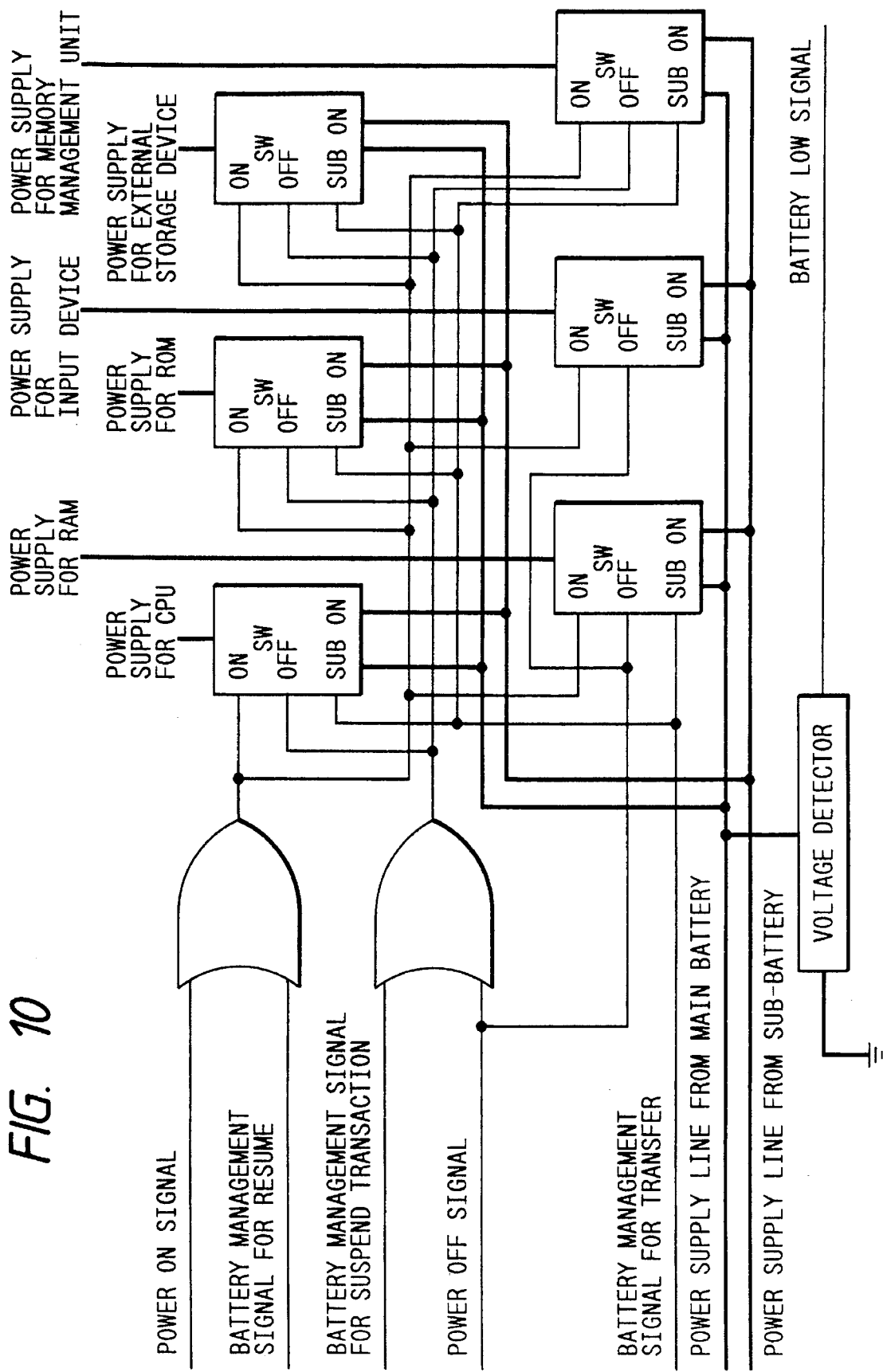
FIG. 10 is a block diagram showing an actual example of the battery management unit shown in FIG. 9.
Figure 11:
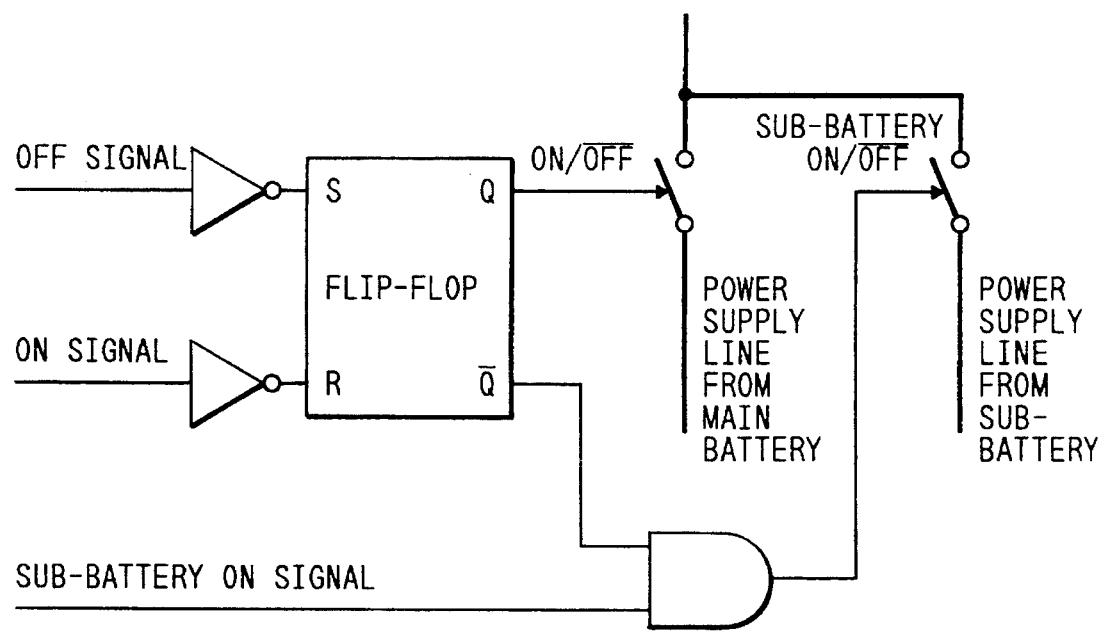
FIG. 11 is a logical circuit diagram showing the constitution of the power ON/OFF switch shown in FIG. 10.

FIG. 10 is a block diagram showing an actual example of the battery management unit 702 in this embodiment. In this example, as shown in FIG. 10, the number of power supply lines from the sub-battery is increased compared with that shown in FIG. 7 and as a result, the constitution of the power ON/OFF switch is changed as shown in FIG. 11. In the battery management unit 702 shown in FIG. 10, when the power ON signal or the battery management signal for resume 119 is true, power is supplied to all the circuit components (the aforementioned external storage device 105 is included) of the information processor from the main battery 107. When the battery management signal for suspend transaction 116 is true, the CPU 101, the memory management unit 102, the ROM 103, and the external storage device 105 are turned off and power is supplied to the RAM 104 and the input device 106 from the main battery 107. When the power off signal 125 is true, all the circuit components (the aforementioned external storage device 105 is included) of the information processor are turned off. When the battery management signal for transfer 123 becomes true, power is supplied to all the circuit components (the aforementioned external storage device 105 is included) of the information processor from the sub-battery 701.

According to the aforementioned first embodiment, the battery 107 is generally degraded and the battery capacity is reduced, so that it is difficult to set the aforementioned threshold voltage. According to this embodiment, however, the sub-battery 701 is used only for transfer transaction, so that there is no need to reserve power for transfer in the main battery 107 and the threshold voltage can be set simply.

Figure 12:
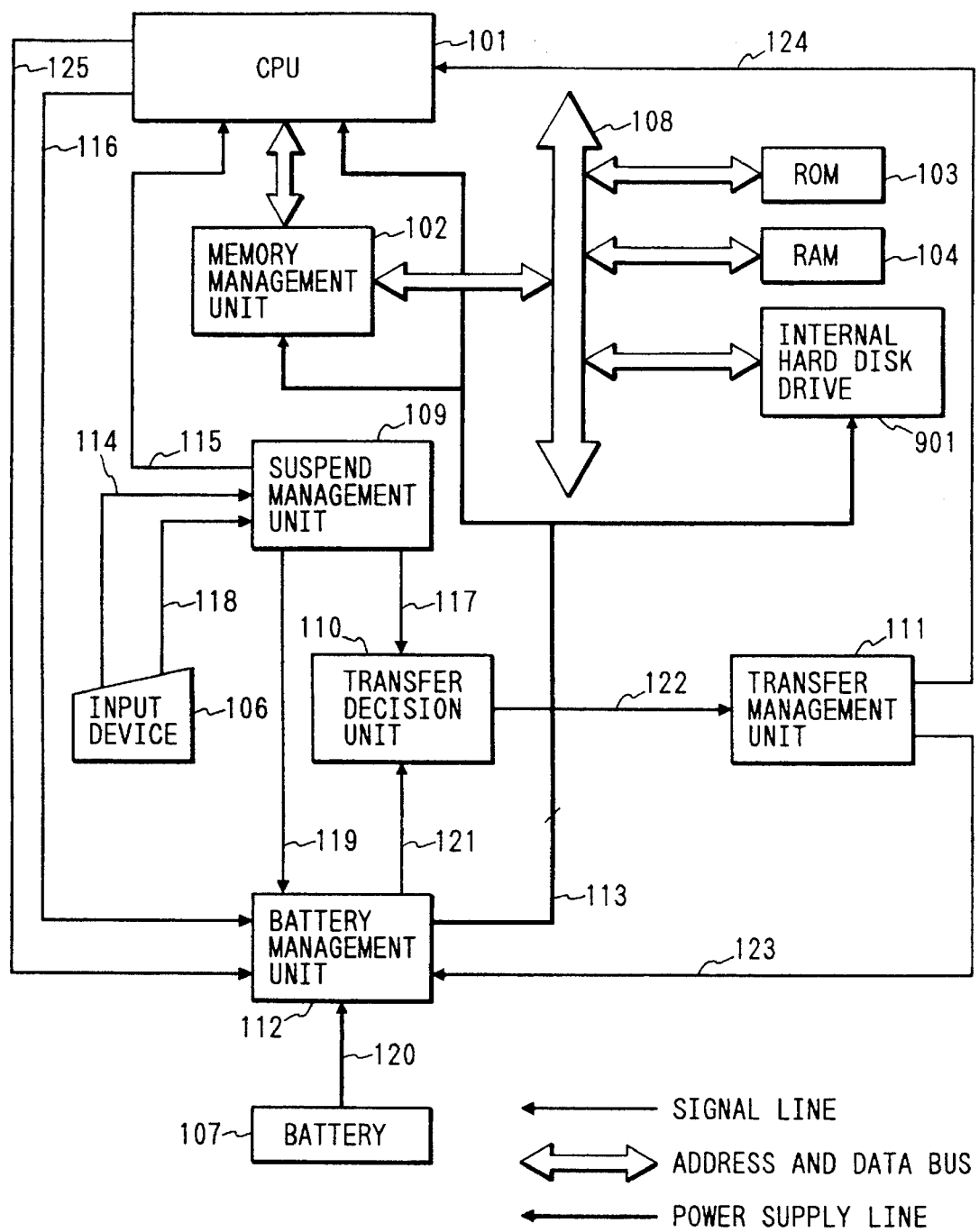
FIG. 12 is a block diagram showing the constitution of an information processor operating with a battery relating to the third embodiment of the present invention.

Next, the third embodiment of the present invention will be explained with reference to FIG. 12. FIG. 12 is a block diagram showing the constitution of an information processor operating with a battery in this embodiment. A difference between this embodiment and the aforementioned first embodiment is that the aforementioned external storage device 105 in the first embodiment is replaced with an internal hard disk drive 901. According to this embodiment, the saving of the transferred data from the RAM 104 which is executed by the external storage device 105 in the aforementioned first embodiment is executed by the internal hard disk drive 901 and the other operations are the same as those of the first embodiment. According to this embodiment, as mentioned above, the effect of the aforementioned first embodiment is obtained even in an information processor having the internal hard disk drive 901 instead of the external storage device 105.

Figure 13:
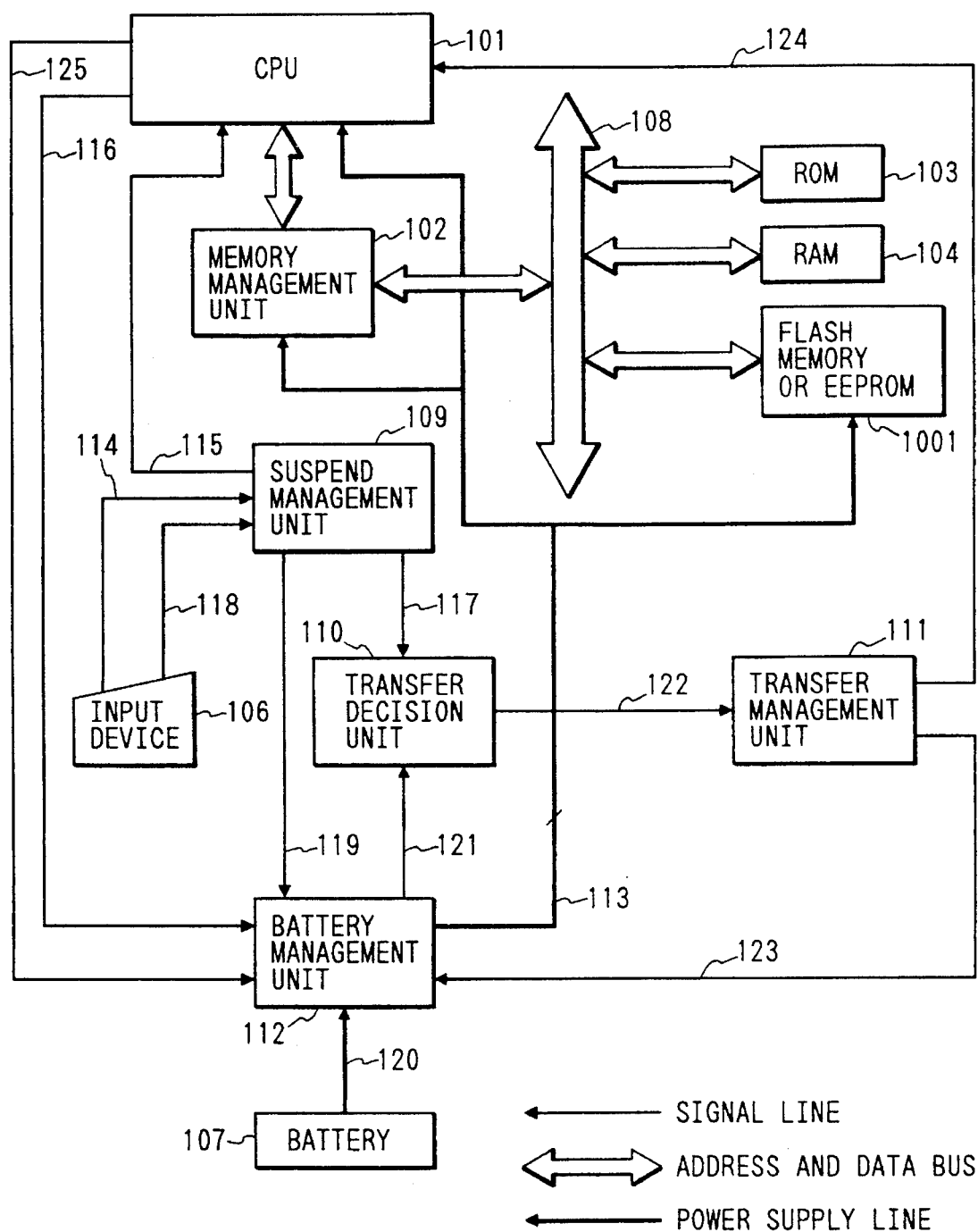
FIG. 13 is a block diagram showing the constitution of an information processor operating with a battery relating to the fourth embodiment of the present invention.

Next, the fourth embodiment of the present invention will be explained with reference to FIG. 13. FIG. 13 is a block diagram showing the constitution of an information processor operating with a battery in this embodiment. A difference between this embodiment and the aforementioned first embodiment is that the aforementioned external storage device 105 in the first embodiment is replaced with a nonvolatile semiconductor memory 1001 such as a flash memory or EEPROM (electrically erasable and programmable ROM) built in the information processor. According to this embodiment, the saving of the transferred data from the RAM 104 which is executed by the external storage device 105 in the aforementioned first embodiment is executed by the nonvolatile semiconductor memory 1001 such as a flash memory or EEPROM and the other operations are the same as those of the first embodiment. According to this embodiment, as mentioned above, the effects of the aforementioned first and third embodiments are obtained even in an information processor which has not the external storage device 105 and the internal hard disk driver 901.

Figure 14:
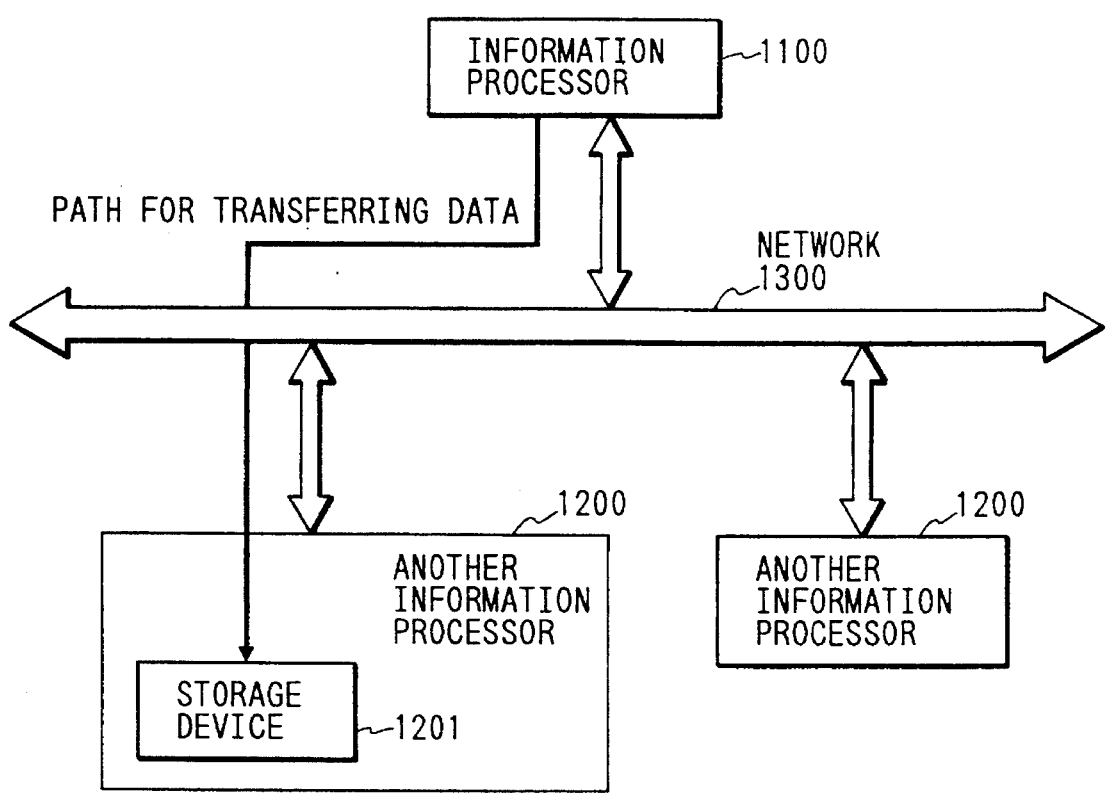
FIG. 14 is a schematic block diagram showing the status when an information processor of the fifth embodiment of the present invention is connected to another information processor via a network.

Next, the fifth embodiment of the present invention will be explained with reference to FIG. 14. FIG. 14 is a schematic block diagram showing the status when an information processor 1100 in this embodiment is connected to another information processor 1200 via a network. The information processor 1100 in this embodiment has functions which are the same as those of the information processor in each embodiment mentioned above, though it does not have the external storage device 105 for saving transferred data from the RAM 104, the internal hard disk driver 901, and the nonvolatile semiconductor memory 1001 in each embodiment mentioned above which are not shown in the drawing. According to this embodiment, data in the RAM 104 is not transferred and stored in the data storage means (the external storage device 105, the internal hard disk driver 901, or the non-volatile semiconductor memory 1001) which is managed by the information processor itself in each embodiment mentioned above (transferred data is not saved in the information processor of the present invention) but transferred and stored in another information processor 1200 which is connected by a network 1300. Namely, if the battery becomes insufficient when the information processor 1100 in this embodiment is in the suspended state, the information processor 1100 starts temporarily by it, reads out data in the RAM 104, and sends the read data to the network 1300. The data is received by another information processor 1200 connected to the network and saved in a storage device 1201 which is managed by the above information processor 1200. According to the present invention having the aforementioned constitution, the effect of each embodiment mentioned above is obtained even in an information processor having no storage means other than the RAM and ROM.

Figure 15:
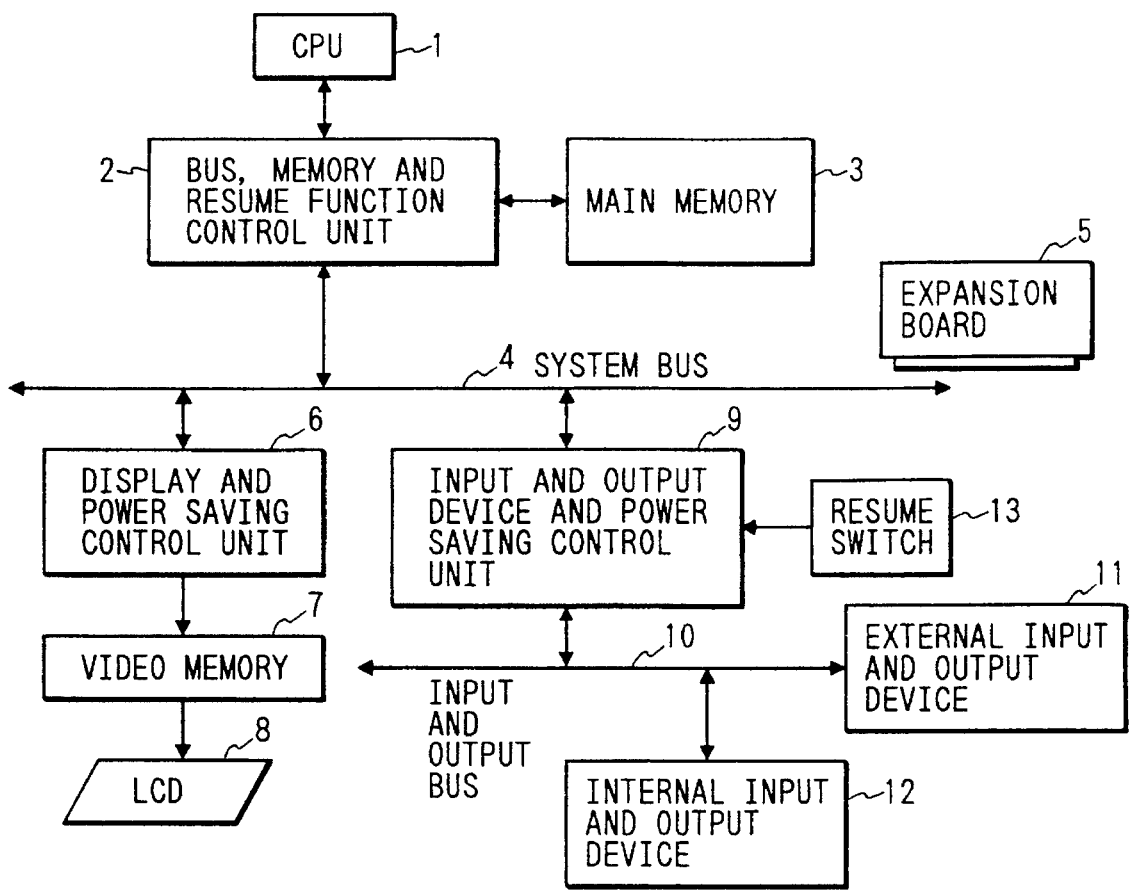
FIG. 15 is a block diagram showing the sixth embodiment of the present invention.

FIG. 15 is a drawing showing the schematic constitution of the sixth embodiment of the present invention. In the drawing, a reference numeral 1 indicates a central processing unit (CPU) which fulfills the central function of the information processor, 2 a bus, memory and resume function control unit for executing the access to memory control, the system bus control, and the resume function (function for transferring data which exists in the CPU so as to be processed by the CPU and display data into the backup storage area and turning off the power supply to each unit of the information processor when data input from the key input unit is not detected within the predetermined period and for returning the above CPU data to the CPU again and displaying the above display data again when the power is turned on again so as to prevent the battery from consumption) control, that is, the resume control, 3 a main memory, 4 a system bus, 5 an expansion board for expanded functions, 6 a display and power saving control unit for controlling LCD (liquid crystal display device) display and lowering the power consumption by back light control or others, 7 a video memory, 8 a display device (LCD), 9 an input and output device and power saving control unit for controlling input and output and lowering the power consumption in each input and output device, 10 an input and output bus to which each input and output device is connected, 11 an external input and output device which is connected to the slot which is provided in the standard type of information processor, 12 an internal input and output device incorporated in the information processor, and 13 a resume switch for starting the resume function.

In the information processor shown in FIG. 15, when the resume switch 13 is pressed by an operator, the information which is being processed by the CPU at present and the displayed information are stored in the main memory 3 and the video memory 7 (backup storage area) and the information processor is shifted to the suspended state. Namely, the input and output device and power saving control unit 9 accepts pressing of the resume switch 13 as one input and output interrupt and watches the access statuses from the expansion board 5 which has a possibility of data input and output, the external input and output device 11, and the internal input and output device 12. When access is made from one of the input and output devices, the input and output device and power saving control unit 9 instructs the resume function control unit 2 to execute the resume operation after the access is completed and informs the expansion board 5, the external input and output device 11, and the internal input and output device 12 that the resume function control unit 2 is performing the resume operation so that they will not accept access during the resume operation. Then, the information processor shifts to the access inhibition state and the input and output device and power saving control unit 9 and the bus, memory and resume function control unit 2 allow the main memory 3 to store the information in the CPU 1. The display and power saving control unit 6 executes the processing for storing display data in the video memory 7 in the resume operation. When the capacity of the main memory 3 of the information processor in this embodiment is sufficient, display data can be stored in the main memory 3 by the bus, memory and resume function control unit 2. Storing information in a memory to shift to the suspended state like this is referred to as "information is backed up by a memory".

Figure 16:
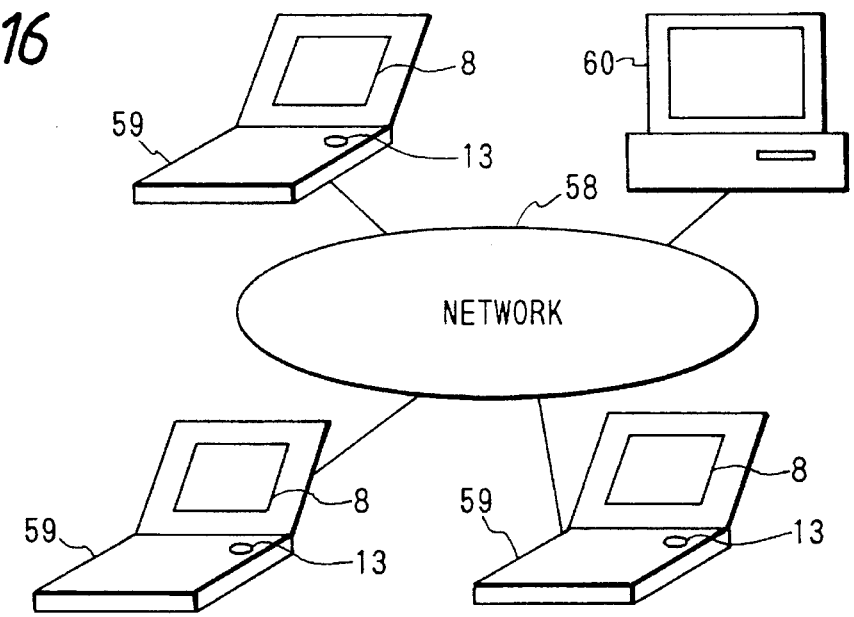
FIG. 16 is a drawing showing an example of a network system using the information processor shown in FIG. 15.

FIG. 16 is a drawing showing a configuration example of a network system using the information processor shown in FIG. 15. In the drawing, a reference numeral 58 indicates a network such as a LAN for connecting each processor, 59 the information processor shown in FIG. 15, and 60 another desktop type information processor. The network 58 consists of a connection of a main frame which is not shown in the drawing and accessable cable connections between processors such as a connection between a personal computer (PC) and a work station (WS).

Figure 17:
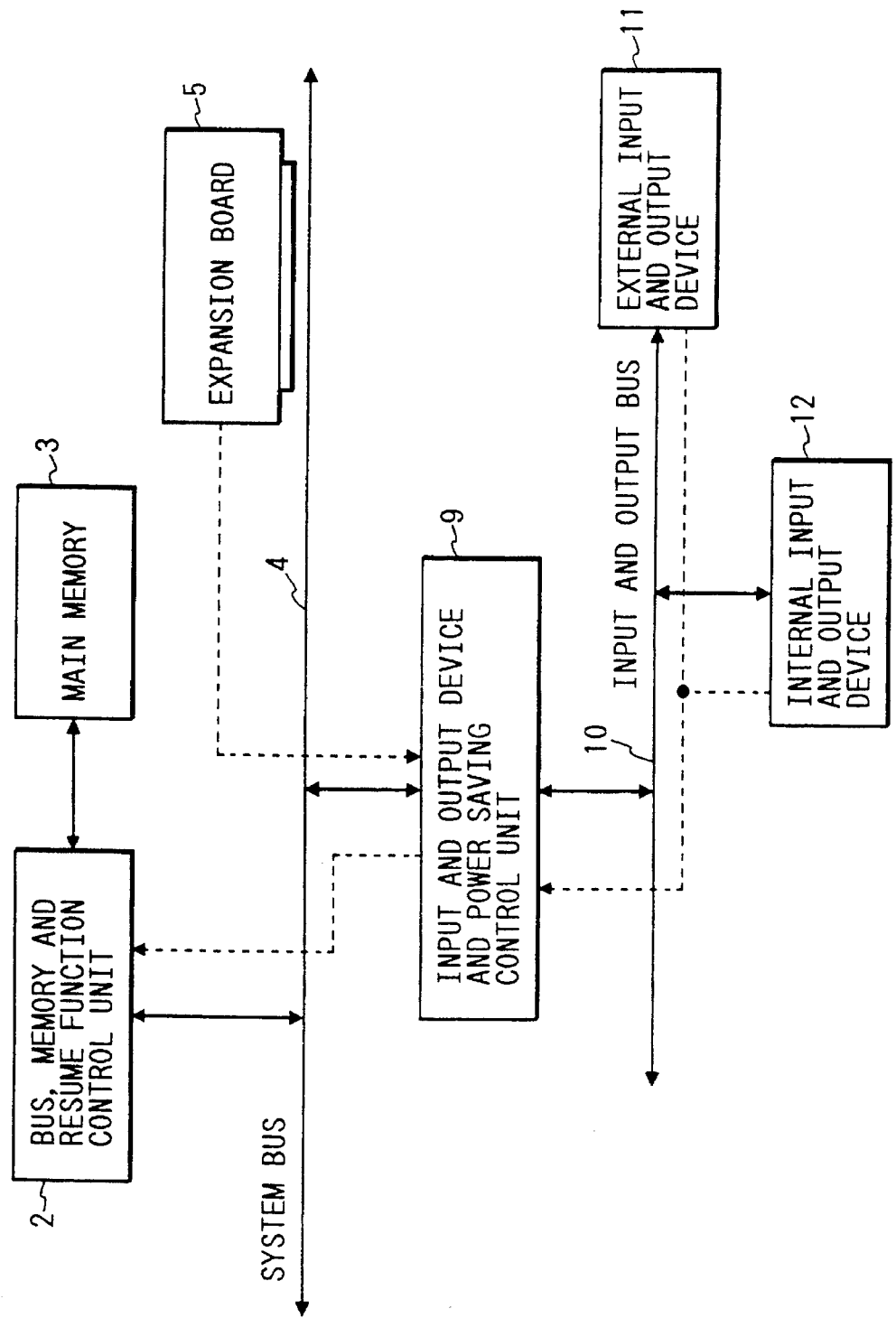
FIG. 17 is a block diagram showing the resume function related part which is extracted from FIG. 15.

FIG. 17 is a drawing showing the resume function related part which is extracted from FIG. 15. To the parts shown in FIG. 17 which are the same as those shown in FIG. 15, the same numbers are assigned and the explanation is omitted. In FIG. 17, the bus, memory and resume function control unit 2 performs the backup processing for storing information in the main memory 3 in the resume operation on the basis of the access watching information from the input and output device and power saving control unit 9. However, in a work station to be used in the network environment shown in FIG. 16, if the resume operation is executed when access from the external via the network (for example, access to the internal hard disk from another work station, etc.) is being made, the access is suspended and the data reliability will not be guaranteed. To respond to the problem, access from various input and output devices such as the expansion board 5, the internal input and output device 12, and the external input and output device 11 is watched by the input and output device and power saving control unit 9.

Figure 18:
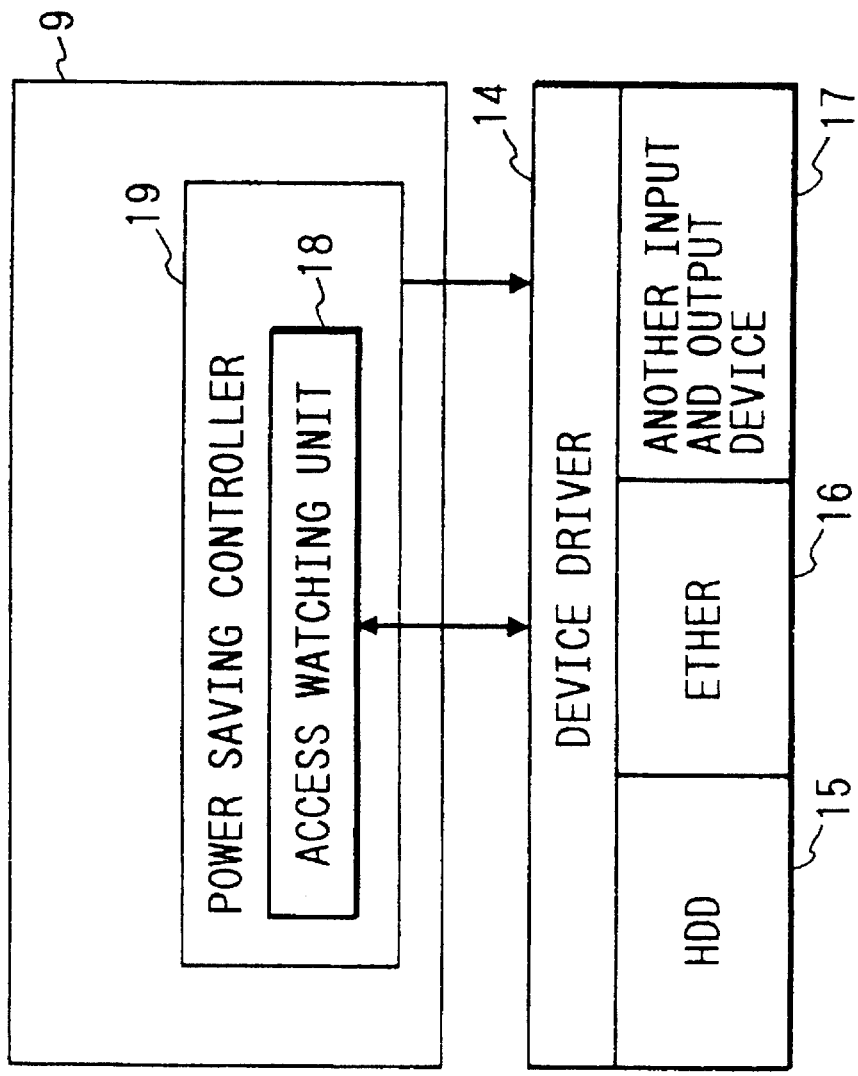
FIG. 18 is a detailed drawing of the input and output device and power saving control unit shown in FIG. 17.

FIG. 18 is a detailed drawing of the input and output device and power saving control unit shown in FIG. 17. In the drawing, a reference numeral 14 indicates a device driver which is an interface between the information processor and the input and output device (any one of the expansion board 5, the internal input and output device 12, and the external input and output device 11), 15 a hard disk drive (HDD) which is a file system unit, 16 an Ether net which is a network interface, 17 another input and output device (I/O) constituting the information processor, 18 an access watching unit for watching where there is access from each input and output device or not, and 19 a power saving controller for controlling power saving in the battery drive. The device driver 14 which is driver software is generally mounted for the input and output devices constituting the information processor and used as an interface between the information processor body and the input and output devices. For example, when the SCSI command is executed by the HDD 15, the device driver 14 translates it so that it can be identified by the devices and transfers the instruction contents to the devices. According to this embodiment, a function for access watching such as issuing a command is added to the device driver 14. The access watching unit 18 in the power saving controller 19 identifies whether there is access from each input and output device or not according to a command issued from the device driver 14 and the power saving controller 19 operates to stop power supply to input and output devices where no access is generated. By watching the access status of each input and output device thoroughly by the device driver 14 and controlling power supply like this, the power consumption can be reduced.

Next, control of supply of backup power to the memory after the resume function is started by the internal battery will be explained.

Figure 19:
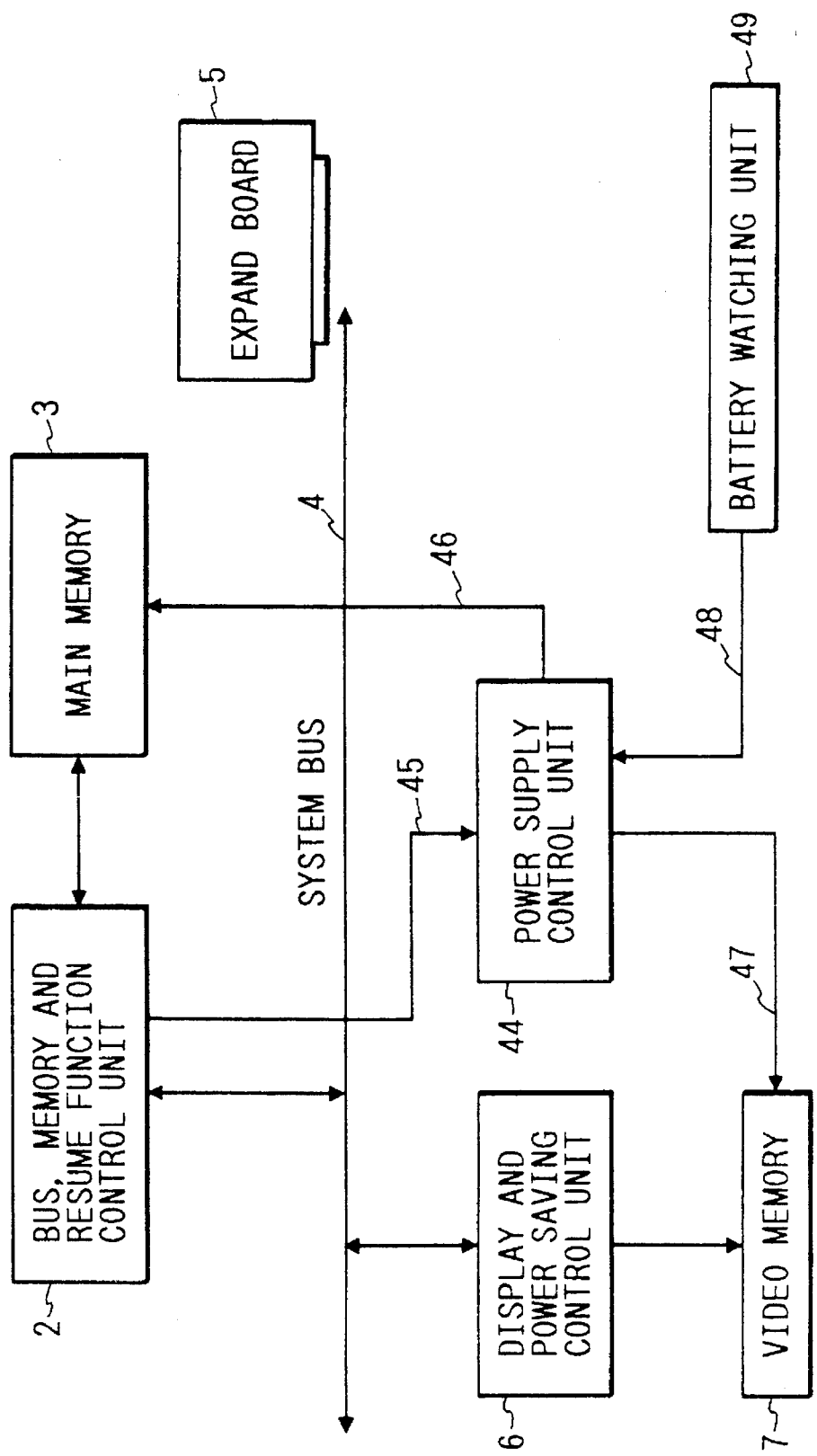
FIG. 19 is a block diagram showing the essential section of the seventh embodiment of the present invention.

FIG. 19 is a drawing showing the essential section of the seventh embodiment of the information processor of the present invention. To the parts shown in FIG. 19 which are the same as those shown in FIG. 15, the same numbers are assigned and the explanation is omitted. A reference numeral 44 indicates a power supply control unit for controlling supply of backup power in the resume operation, 45 a power supply start signal for backup of the memory for starting the resume function from the bus, memory and resume function control unit 2 and for instructing supply of backup power necessary to hold data to be saved in the memory, 46 a power supply line for backup of the main memory for supplying power for backup of the main memory, 47 a power supply line for backup of the video memory for supplying power for backup of the video memory, 48 a battery watching signal for watching the remaining capacity of the battery, and 49 a battery watching unit for outputting the battery watching signal 48 corresponding to whether the remaining capacity of the battery reaches a predetermined capacity or not.

In FIG. 19, the power supply control unit 44 receives an instruction for shifting to the suspended state from the bus, memory and resume function control unit 2 and controls so as to supply backup power only to the main memory 3 for holding data and the video memory 7 and to stop the power supply to the other circuits. The display and power saving control unit 6 receives a display system power off signal and stops the back light and display so as to reduce the power consumption of the battery and to prolong the operation time. When the remaining capacity of the battery which is watched by the battery watching unit 49 does not reach the predetermined capacity at this time and the backup power for maintaining the suspended state cannot be supplied, the power supply control unit 44 controls so as to execute the shutdown operation (the data to be saved is transferred to the auxiliary storage device such as the hard disk and the power supply to all the units is stopped) in place of the resume operation.

FIG. 20 is a drawing showing the power supply control related part which is extracted from FIG. 19. To the parts shown in FIG. 20 which are the same as those shown in FIG. 19, the same numbers are assigned and the explanation is omitted. A reference numeral 50 indicates an RM (resume) register which is built in the bus, memory and resume function control unit and in which information relating to supply of backup power to each memory in the resume operation is set. Namely, a reference numeral 51 indicates an MS (main storage) bit for the main memory of the RM register 50, 52 a VRAM (video RAM) bit for the video memory of the RM register 50, and 53 a BA (battery) bit for setting the battery status.

In FIG. 20, the power supply control unit 44 controls supply of backup power to each memory in correspondence with the set information of the MS bit 51 and the VRAM bit 52 which is transferred by the memory backup power supply starting signal 45 (the RM register 50 is set by the resume management module which will be described later). The power supply control unit 44 always receives the battery watching signal 48 from the battery watching unit 49 and watches the information of the remaining capacity of the battery. The battery watching unit 49 supplies the battery watching signal 48 to the power supply control unit 44 and sets the information of whether there is a remaining capacity of the battery which is sufficient to hold the suspended state or not in the BA bit 53 in the RM register 50. By turning, for example, an LED on or off in correspondence with the set information of the BA bit 53, an operator may be informed of the remaining capacity of the battery. When a process management module 24 which will be described later reads the BA bit 53, the OS (operating system) watches the remaining capacity of the battery and when the remaining capacity is insufficient, the shutdown operation can be executed automatically in place of the resume operation.

When the above MS bit 51 and the VRAM bit 52 consist of a plurality of bits, whether or not to supply backup power can be controlled in bank units for the main memory 3 or in plane units (frame units) for the video memory. FIG. 21 is a drawing showing another configuration example of the RM register shown in FIG. 20. To the parts shown in FIG. 21 which are the same as those shown in FIG. 20, the same numbers are assigned and the explanation is omitted. A reference numeral 54 indicates a bank bit for showing whether or not to hold the contents of the relevant memory bank in correspondence with the memory bank constitution of the main memory 3 bit by bit, 55 a plane bit for showing whether or not to hold the contents of the relevant display plane in correspondence with the number of display planes of the video memory 7 bit by bit, 56 a charge bit for showing that the battery is being charged, and 57 a remaining capacity bit for showing the remaining capacity of the battery. Namely, by controlling supply of backup power by the power supply control unit 44 in correspondence with the above information showing whether backup in bank units and plane units is necessary or not, power in correspondence with the information amount to be backed up can be supplied so as to save the power.

FIG. 22 is a drawing showing a configuration example of the operating system of the information processor of the present invention. In the drawing, a reference numeral 20 indicates various types of application software (AP) such as text preparation/editing and table calculation, 21 a network module for controlling the inter-processor network, 22 a file system module for controlling the file systems such as the device driver for hard disk drive (HDD) and the device driver for floppy disk drive (FDD), 23 a terminal module for supporting the terminal function of the main frame which is a host computer, 24 a process management module for managing various processes which operate under the operating system (OS), 25 a resume management module for managing shifting to the resume function, and 26 a kernel which is the operating system body.

In the environment of the operating system shown in FIG. 22, by minimizing the scale of the kernel, the disk capacity necessary to install the system is reduced and by modularizing and adding each necessary function, the user area is taken out at its maximum and functions are expanded in response to users' requests. According to this embodiment, by adding the function modules 21 to 25 including the device drivers in the host hierarchy of the kernel, the resume function is realized. Namely, by watching the access statuses from the network, hard disk drive, and floppy disk drive by the device drivers which are built in the network module 21, the file system module 22, the terminal module 23, and the process management module 24 respectively, the software for realizing the resume function by the resume management module is executed.

Figure 23:
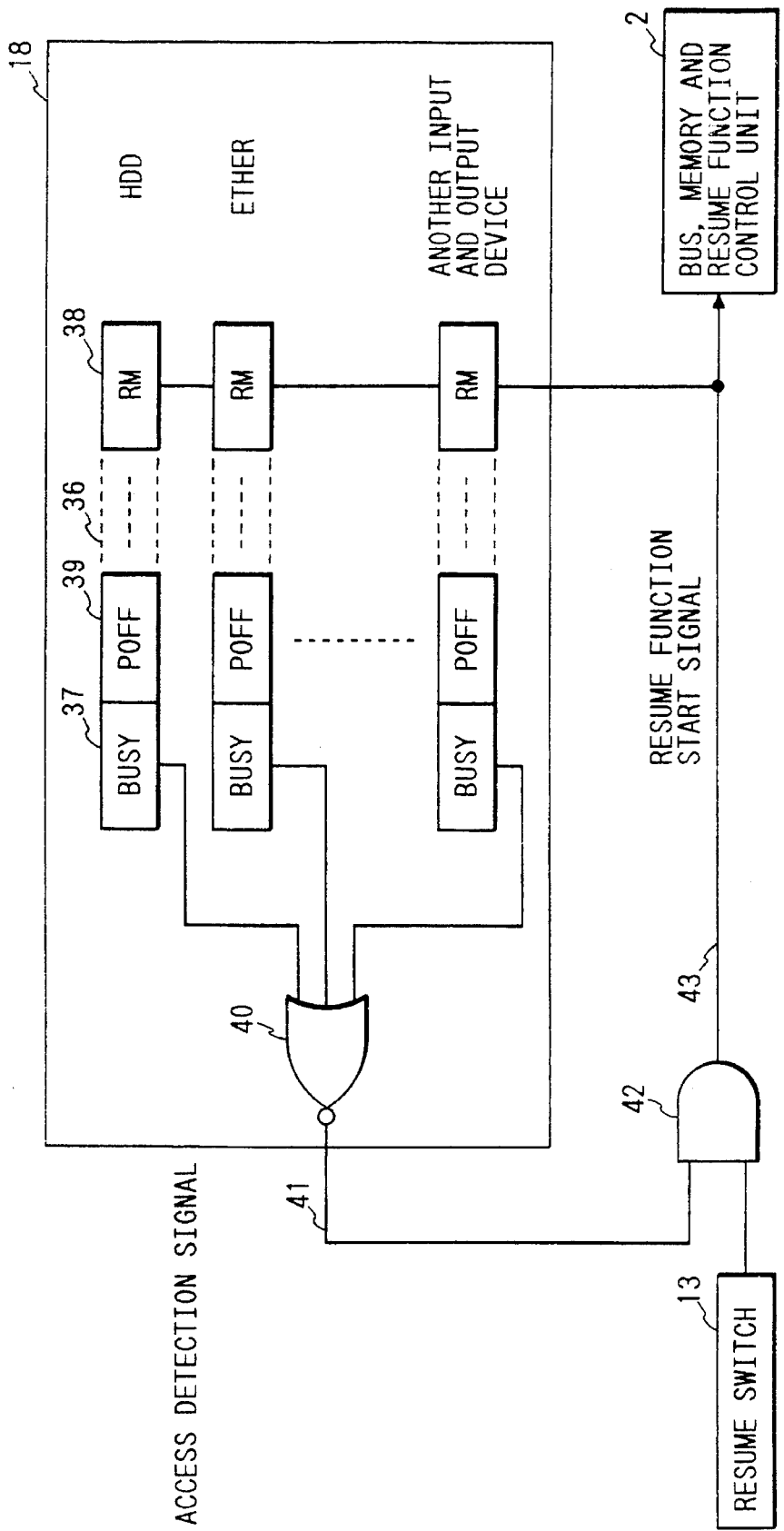
FIG. 23 is a block diagram showing an example of the access watching unit shown in FIG. 18.

FIG. 23 is a drawing showing a configuration example of the access watching unit shown in FIG. 18. In the drawing, a reference numeral 36 indicates a status register for watching the input and output status with each input and output device. The status register 36 consists of a Busy bit 37 showing that access is being made to the relevant input and output device, an RM (resume) bit 38 for storing the information for outputting a response indicating that it is in the suspended state and in the access inhibition state to the relevant input and output device, and a POFF (power off) bit 39 for showing that the power supply to the relevant input and output device is to be stopped. A reference numeral 40 indicates an access detection gate for detecting that access is being made to one of the input and output devices from the status of the Busy bit 37, 41 an access detection signal outputted from the access detection gate 40, 42 a resume function start signal generation gate for ANDing a resume instruction signal from a resume switch 13 and the access detection signal 41, and 43 a resume function start signal which is generated by the resume function start signal generation gate 42.

In FIG. 23, the status register 36 is set and read by the device driver corresponding to each input and output device (built in the network module 21, the file system module 22, the terminal module 23, and the process management module 24 shown in FIG. 22 respectively) and the resume management module 25 shown in FIG. 22. Namely, when access is generated to any of the input and output devices, for example, to the network, the device driver built in the network module 21 sets the Busy bit 37 in the corresponding status register 36 (status register corresponding to "Ether" shown in FIG. 23) to 1. When the access ends, the same device driver sets the Busy bit 37 to 0 again and then reads out the status register 36 and fetches the information (whether in the access inhibition status or not) indicated by the RM bit 38.

Simultaneously with setting of the Busy bit 37 by the device driver, the RM bit 38 is set in the access inhibition or enable state according to the status of the resume function start signal 43. The resume management module 25 reads out the Busy bit 37 and the RM bit 38 corresponding to each input and output device and manages the status of the information processor on the basis of the read information. Namely, by setting to stop supply of power to an input and output device which is not accessed by the POFF bit 39 of the status register 36 which corresponds to such an unaccessed input and output device, unnecessary power supply is stopped and the power can be saved. The device driver corresponding to each input and output device reads out the corresponding status register 36 and detects the RM bit 38 thereof. As a result, when the RM bit 38 is set at 1, the device driver recognizes that the information processor is in the shift to suspended state preparation state and will not accept the next access from each input and output device. By the resume function start signal 43, the bus, memory and resume function control unit 2 backs up the current processing information and display contents by the main memory 3 and the video memory 7.

By pressing the resume switch 13 by an operator when the power is to be forcibly turned off with the information at the end held, the information processor shifts to the suspended state. When access is made from the external via the network at this time, by masking the resume function start signal by the resume function start signal generation gate 42, the information processor withholds shift to the suspended state temporarily until the current access is completed.

Figure 24:
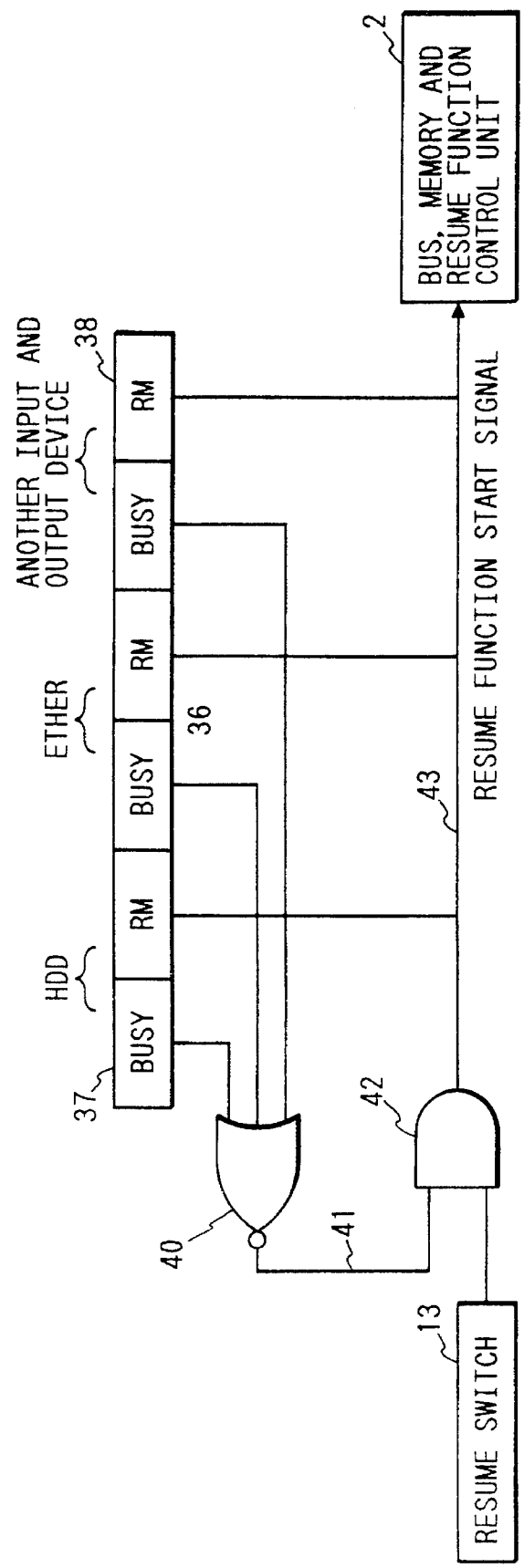
FIG. 24 is a block diagram showing another example of the access watching unit shown in FIG. 18.

FIG. 24 is a drawing showing another configuration example of the access watching unit shown in FIG. 18. Although the status register 36 of another address is mounted for each input and output device in FIG. 23, the status register 36 of the same address is mounted in FIG. 24. According to this constitution, the logical scale of the hardware such as the address decoding circuit and register can be reduced more. However, it is necessary to arbitrate access to the above status register 36 from the device driver corresponding to each input and output device and the resume management module 25 by the process management module 24.

Figure 25:
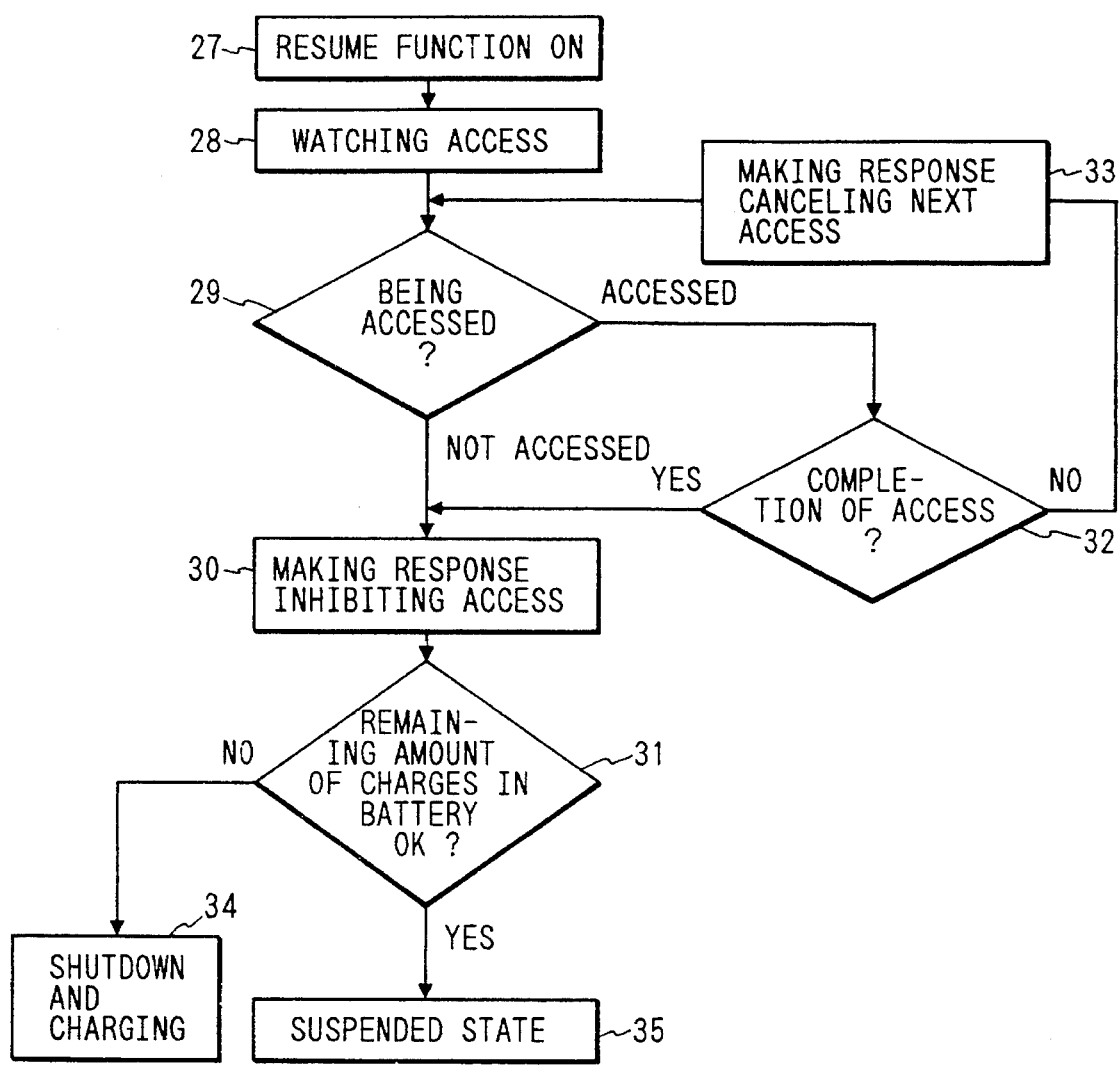
FIG. 25 is a flow chart showing the resume operation of the information processor of the present invention.

FIG. 25 is a flow chart showing the resume operation of the information processor of the present invention. When the resume switch 13 shown in FIG. 15 is pressed by an operator, the information processor shifts to the resume operation, that is, the resume function ON processing at Step 27. The information processor reads out the status register 36 shown in FIGS. 23 and 24 by the device driver corresponding to each input and output device and watches access (Step 28). The information processor decides whether access is made or not at Step 29. When no access is made, the information processor makes a response inhibiting access so as to prevent the next access from being made until the information processor perfectly shifts to the suspended state (Step 30). Namely, for an information processor which makes access via the network during the resume operation, the information processor sends a retry response (response for prompting another access) or a system down response (response for notifying that the information processor is not in the usable state). When the information processor shifts to the suspended state perfectly, it returns to the normal operation mode immediately and responds to access from the external (so as to prevent the execution of the background task from suspension).

If access is made when the information processor decides whether access is made or not at Step 29, the information processor decides completion of access at Step 32. When the access is not completed, to suppress execution of continuous access after completion of access, the information processor makes a response canceling next access at Step 33 and decides Step 29 until the access is completed.

The information processor makes a response inhibiting access at Step 30, checks the remaining capacity of the battery at Step 31, and decides whether it is sufficient to shift to the suspended state or not. When the remaining capacity of the battery is insufficient, the information processor executes the shutdown operation and charges the battery (Step 34). When the remaining capacity of the battery is sufficient, the information processor shifts to the suspended state (Step 35).

According to this embodiment, as mentioned above, the information processor having the resume function is provided with a resume management unit for confirming whether there is the aforementioned data input and output by the aforementioned access watching unit when the aforementioned resume function is started, for completing the aforementioned data input and output in execution, and for canceling the following aforementioned data input and output, so that data which is inputted and outputted via the network is not damaged when the resume function is started and the safety and reliability of inputted and outputted data can be improved. The information processor is also provided with a battery watching unit for outputting a battery watching signal indicating whether the remaining capacity of the battery reaches a predetermined capacity or not and a power supply control unit for shifting the processor body to the suspended state when the above remaining capacity of the battery reaches the predetermined capacity when the above resume function is started or to the shutdown state when the remaining capacity does not reach the predetermined capacity, so that when the remaining capacity of the battery is insufficient to realize the resume function, the shutdown operation accompanied by the saving operation of all data into the hard disk drive is executed and the safety and reliability of data to be inputted and outputted can be improved.

According to the information processor operating with a battery of the present invention, as mentioned above, the current register status of the CPU and others are written into the predetermined stack area for transfer of the RAM when a suspend command is received and the information processor shifts to the suspended state that the power supply to the minimum circuit components including the RAM is maintained and the power supply to the other circuit components is stopped, so that the aforementioned suspend transaction time can be shortened, and the aforementioned suspend transaction power consumption is reduced, and the power consumption can be reduced greatly. When insufficient power of the battery is detected in the suspended state, the data of the RAM is automatically transferred and stored in the non-volatile memory device (because the suspended state is held). Therefore, even when the power of the battery becomes insufficient in the suspended state, erasure of the data in the main memory and destruction of a file in transaction due to insufficient power of the battery can be prevented surely.

According to an embodiment of the present invention, the information processor is provided with an access watching unit for always detecting whether there is data input and output for an input and output device or not and a power saving control unit for stopping power supply to the above input and output device in which it is detected by the above access watching unit that the above data input and output is not executed, so that the power consumption can be reduced to a certain extent in the normal operation state.

What is claimed is:

1. An information processor operating on power supplied from battery comprising:

a central processing unit;

a memory management means;

a random access memory;

a read only memory;

a data storage means for holding stored data even if no power is supplied;

an input means for inputting commands;

a battery for supplying power;

a battery management means for receiving power from said battery, for supplying the power selectively to said central processing unit said memory management means, said random access memory, said read only memory, said data storage means, and said input means, and for sending a battery Low signal when the power of said battery becomes insufficient;

a suspend management unit for sending a suspend transaction interrupt signal and a suspend status signal indicating that said information processor is in a suspended state at present when a suspend command is inputted from said input means and for sending a battery management signal for resume when a resume command is inputted from said input means;

a transfer decision unit for generating a transfer transaction trigger signal on the basis of said battery Low signal sent from said battery management means and said suspend status signal sent from said suspend management unit; and a transfer management unit for sending a battery management signal for transfer to said battery management means and furthermore a transfer transaction interrupt signal to said central processing unit when said transfer transaction trigger signal sent from said transfer decision unit is received, wherein when said suspend command for suspending the processing of said information processor is given to said suspend management unit from said input means, said suspend management unit sends said suspend transaction interrupt signal to said central processing unit, and said central processing unit having received said suspend transaction interrupt signal stops a job which is in execution at that time and stores data which exists in the central processing unit itself at that time in said random access memory, and thereafter said central processing unit sends a battery management signal for suspend transaction to said battery management means, and said battery management means having received said battery management signal for suspend transaction stops supply of power to said central processing unit, said memory management means, said read only memory, and said data storage means, and accordingly said information processor shifts to said suspended state, and wherein if said battery power becomes insufficient when said information processor is in said suspended state, said battery management means sends a battery Low signal to said transfer decision unit, and said transfer decision unit sends a transfer transaction trigger signal to said transfer management unit on the basis of said battery Low signal and said suspend status signal which is sent from said suspend management unit already, and said transfer management unit sends a battery management signal for transfer to said battery management means and furthermore a transfer transaction interrupt signal to said central processing unit according to said transfer transaction trigger signal, and said battery management means having received said battery management signal for transfer supplies power to said central processing unit, said memory management means, said read only memory, and said data storage means again, and said central processing unit which is has been started accordingly transfers the data having been stored in said random access memory into said data storage means which can save stored data even if no power is supplied in response to said transfer transaction interrupt signal sent from said transfer management unit.

2. An information processor according to claim 1, wherein said data storage means which can save stored data even if no power is supplied is an external storage device connected to said information processor.

3. An information processor according to claim 1, wherein said data storage means which can save stored data even if no power is supplied is a disk storage device built in said information processor.

4. An information processor according to claim 1, wherein said data storage means which can save stored data even if no power is supplied is a non-volatile semiconductor memory built in said information processor.

5. An information processor according to claim 1, wherein said battery includes a main battery and a sub-battery, and said battery management means sends said battery Low signal if the power of said main battery becomes insufficient when said information processor is in said suspended state, and said battery management means supplies power to said central processing unit, said memory management means, said read only memory, and said data storage means from said sub-battery when it receives said battery management signal for transfer.

6. An information processor according to claim 5, wherein said data storage means which can save stored data even if no power is supplied is an external storage device connected to said information processor.

7. An information processor according to claim 5, wherein said data storage means which can save stored data even if no power is supplied is a disk storage device built in said information processor.

8. An information processor according to claim 5, wherein said data storage means which can save stored data even if no power is supplied is a non-volatile semiconductor memory built in said information processor.

9. An information processor operating on power supplied from battery comprising:

a central processing unit;

a memory management means;

a random access memory;

a read only memory;

an input means for inputting commands;

a battery for supplying power;

a battery management means for receiving power from said battery, for supplying the power selectively to said central processing unit, said memory management means, said random access memory, said read only memory, and said input means, and for sending a battery Low signal when the power of said battery becomes insufficient;

a suspend management unit for sending a suspend transaction interrupt signal and a suspend status signal indicating that said information processor is in a suspended state at present when a suspend command is inputted from said input means and for sending a battery management signal for resume when a resume command is inputted from said input means;

a transfer decision unit for generating a transfer transaction trigger signal on the basis of said battery Low signal sent from said battery management means and said suspend status signal sent from said suspend management unit; and a transfer management unit for sending a battery management signal for transfer to said battery management means and furthermore a transfer transaction interrupt signal to said central processing unit when said transfer transaction trigger signal sent from said transfer decision unit is received, wherein when said suspend command for suspending the processing of said information processor is given to said suspend management unit from said input means, said suspend management unit sends said suspend transaction interrupt signal to said central processing unit, and said central processing unit having received said suspend transaction interrupt signal stops a job which is in execution at that time and stores data which exists in the central processing unit itself at that time in said random access memory, and thereafter said central processing unit sends a battery management signal for suspend transaction to said battery management means, and said battery management means having received said battery management signal for suspend transaction stops supply of power to said central processing unit, said memory management means, and said read only memory, and accordingly said information processor shifts to said suspended state, and wherein if said battery power becomes insufficient when said information processor is in said suspended state, said battery management means sends a battery Low signal to said transfer decision unit, and said transfer decision unit sends a transfer transaction trigger signal to said transfer management unit on the basis of said battery Low signal and said suspend status signal which is sent from said suspend management unit already, and said transfer management unit sends a battery management signal for transfer to said battery management means and furthermore a transfer transaction interrupt signal to said central processing unit according to said transfer transaction trigger signal, and said battery management means having received said battery management signal for transfer supplies power to said central processing unit, said memory management means, and said read only memory again, and said central processing unit which is has been started accordingly transfers the data having been stored in said random access memory into another information processor which is connected to said information processor via the network in response to said transfer transaction interrupt signal sent from said transfer management unit.

10. An information processor according to claim 9, wherein said battery includes a main battery and a sub-battery, and said battery management means sends said battery Low signal if the power of said main battery becomes insufficient when said information processor is in said suspended state, and said battery management means supplies power to said central processing unit, said memory management means, and said read only memory from said sub-battery when it receives said battery management signal for transfer.

11. An information processor according to claim 1, said information processor further having:

a resume function in which data which is being processed by said information processor at present and display data are transferred to a backup storage unit, and supply of power to at least a part of said information processor is stopped, and said data which has been transferred to said backup storage unit is returned to said information processor again when said power supply is restarted comprising:

an access watching unit for detecting whether data is inputted or outputted into or from input and output devices of said information processor when said resume function is started; and a resume control unit for completing the input or output of data in execution and for canceling input or output of a following data into or from said input and output devices when said access watching unit detects that data is being inputted or outputted into or from said input and output devices.

* * * * *